United States Patent
Haas et al.

(10) Patent No.: US 10,786,728 B2
(45) Date of Patent: Sep. 29, 2020

(54) MOTION MIRRORING SYSTEM THAT INCORPORATES VIRTUAL ENVIRONMENT CONSTRAINTS

(71) Applicant: Blast Motion Inc., Carlsbad, CA (US)

(72) Inventors: Juergen Haas, Poway, CA (US); Bhaskar Bose, Carlsbad, CA (US); Michael Bentley, Carlsbad, CA (US); Ryan Kaps, Mesa, AZ (US)

(73) Assignee: Blast Motion Inc., Carlsbad, CA (US)

( * ) Notice: Subject to any disclaimer, the term of this patent is extended or adjusted under 35 U.S.C. 154(b) by 147 days.

(21) Appl. No.: 15/602,853

(22) Filed: May 23, 2017

(65) Prior Publication Data
US 2018/0339223 A1    Nov. 29, 2018

(51) Int. Cl.
*A63F 13/211* (2014.01)
*A63F 13/42* (2014.01)
(Continued)

(52) U.S. Cl.
CPC .......... *A63F 13/211* (2014.09); *A63F 13/235* (2014.09); *A63F 13/25* (2014.09);
(Continued)

(58) Field of Classification Search
CPC .... A63F 13/42; A63F 13/428; A63F 69/3691; A63F 13/211; A63F 13/235; A63F 13/25; A63F 13/525; A63F 13/833; G06T 19/006
(Continued)

(56) References Cited

U.S. PATENT DOCUMENTS 1,712,537 A    5/1929    White
3,182,508 A    5/1965    Varju
(Continued)

FOREIGN PATENT DOCUMENTS

EP    2025369 A2    2/2009
EP    2479993       7/2012
(Continued)

OTHER PUBLICATIONS

Wikipedia "Inertial Navigation System" retrieved from wayback machine on Dec. 26, 2018 from Internet URL<https://web.archive.org/web/20170224173443/https://en.wikipedia.org/wiki/Inertial_navigation_system> which was published on Feb. 27, 2017 to the Internet. (Year: 2017).*

(Continued)

*Primary Examiner* — Jay Trent Liddle
*Assistant Examiner* — Ryan Hsu
(74) *Attorney, Agent, or Firm* — Arc IP Law, PC; Joseph J. Mayo

(57) ABSTRACT

A system that mirrors motion of a physical object by displaying a virtual object moving in a virtual environment. The mirroring display may be used for example for feedback, coaching, or for playing virtual games. Motion of the physical object is measured by motion sensors that may for example include an accelerometer, a gyroscope, and a magnetometer. Sensor data is transmitted to a computer that calculates the position and orientation of the physical object and generates a corresponding position and orientation of the virtual object. The computer may correct or adjust the calculations using sensor data redundancies. The virtual environment may include constraints on the position, orientation, or motion of the virtual object. These constraints may be used to compensate for accumulating errors in position and orientation. The system may for example use (Continued)

proportional error feedback to adjust position and orientation based on sensor redundancies and virtual environment constraints.

19 Claims, 8 Drawing Sheets

(51) Int. Cl.
    *A63F 13/235*     (2014.01)
    *A63F 13/25*     (2014.01)
    *A63F 13/525*     (2014.01)
    *A63F 13/833*     (2014.01)
    *G06T 19/00*     (2011.01)
    *A63F 13/812*     (2014.01)
    *G06T 15/20*     (2011.01)

(52) U.S. Cl.
    CPC ............ *A63F 13/42* (2014.09); *A63F 13/525* (2014.09); *A63F 13/833* (2014.09); *G06T 19/006* (2013.01); *A63F 13/812* (2014.09); *A63F 2300/105* (2013.01); *A63F 2300/8082* (2013.01); *G06T 15/20* (2013.01)

(58) Field of Classification Search
    USPC .......................................... 463/3, 2; 473/151
    See application file for complete search history.

(56) References Cited

U.S. PATENT DOCUMENTS

| | | |
|---|---|---|
| 3,226,704 A | 12/1965 | Petrash |
| 3,270,564 A | 9/1966 | Evans |
| 3,776,556 A | 12/1973 | McLaughlin |
| 3,788,647 A | 1/1974 | Evans |
| 3,792,863 A | 2/1974 | Evans |
| 3,806,131 A | 4/1974 | Evans |
| 3,945,646 A | 3/1976 | Hammond |
| 4,759,219 A | 7/1988 | Cobb et al. |
| 4,898,389 A | 2/1990 | Plutt |
| 4,902,014 A | 2/1990 | Bontomase et al. |
| 4,910,677 A | 3/1990 | Remedio et al. |
| 4,940,236 A | 7/1990 | Allen |
| 4,991,850 A | 2/1991 | Wilhlem |
| 5,056,783 A | 10/1991 | Matcovich et al. |
| 5,086,390 A | 2/1992 | Matthews |
| 5,111,410 A | 5/1992 | Nakayama et al. |
| 5,127,044 A | 6/1992 | Bonito et al. |
| 5,184,295 A | 2/1993 | Mann |
| 5,230,512 A | 7/1993 | Tattershall |
| 5,233,544 A | 8/1993 | Kobayashi |
| 5,249,967 A | 10/1993 | O'Leary et al. |
| 5,259,620 A | 11/1993 | Marocco |
| 5,283,733 A | 2/1994 | Colley |
| 5,298,904 A | 3/1994 | Olich |
| 5,332,225 A | 7/1994 | Ura |
| 5,333,061 A | 7/1994 | Nakashima et al. |
| 5,364,093 A | 11/1994 | Huston et al. |
| 5,372,365 A | 12/1994 | McTeigue et al. |
| 5,441,256 A | 8/1995 | Hackman |
| 5,441,269 A | 8/1995 | Henwood |
| 5,443,260 A | 8/1995 | Stewart et al. |
| 5,486,001 A | 1/1996 | Baker |
| 5,524,081 A | 6/1996 | Paul |
| 5,542,676 A | 8/1996 | Howe et al. |
| 5,592,401 A | 1/1997 | Kramer |
| 5,610,590 A | 3/1997 | Johnson et al. |
| 5,638,300 A | 6/1997 | Johnson |
| 5,665,006 A | 9/1997 | Pellegrini |
| 5,688,183 A | 11/1997 | Sabatino et al. |
| 5,694,340 A | 12/1997 | Kim |
| 5,707,299 A | 1/1998 | McKenna |
| 5,772,522 A | 6/1998 | Nesbit |
| 5,779,555 A | 7/1998 | Nomura et al. |
| 5,792,001 A | 8/1998 | Henwood |
| 5,819,206 A | 10/1998 | Horton |
| 5,826,578 A | 10/1998 | Curchod |
| 5,868,578 A | 2/1999 | Baum |
| 5,904,484 A | 5/1999 | Burns |
| 5,941,779 A | 8/1999 | Zeiner-Gundersen |
| 5,973,596 A | 10/1999 | French et al. |
| 5,993,333 A | 11/1999 | Heckaman |
| 5,998,968 A | 12/1999 | Pittman et al. |
| 6,012,995 A | 1/2000 | Martin |
| 6,030,109 A | 2/2000 | Lobsenz |
| 6,044,704 A | 4/2000 | Sacher |
| 6,073,086 A | 6/2000 | Marinelli |
| 6,224,493 B1 | 5/2001 | Lee et al. |
| 6,248,021 B1 | 6/2001 | Ognjanovic |
| 6,253,159 B1 | 6/2001 | Bett et al. |
| 6,254,492 B1 | 7/2001 | Taggett |
| 6,266,623 B1 | 7/2001 | Vock et al. |
| 6,293,802 B1 | 9/2001 | Ahlgren |
| 6,366,205 B1 | 4/2002 | Sutphen |
| 6,441,745 B1 | 8/2002 | Gates |
| 6,456,938 B1 | 9/2002 | Barnard |
| 6,537,076 B2 | 3/2003 | McNitt |
| 6,540,620 B1 | 4/2003 | Consiglio |
| 6,567,536 B2 | 5/2003 | McNitt |
| 6,582,328 B2 | 6/2003 | Kuta et al. |
| 6,611,141 B1 | 8/2003 | Schulz |
| 6,697,820 B1 | 2/2004 | Tarlie |
| 6,705,942 B1 | 3/2004 | Crook et al. |
| 6,746,336 B1 | 6/2004 | Brant et al. |
| 6,757,572 B1 | 6/2004 | Forest |
| 6,774,932 B1 | 8/2004 | Ewing et al. |
| 6,802,772 B1 | 10/2004 | Kunzle et al. |
| 6,868,338 B1 | 3/2005 | Elliott |
| 6,900,759 B1 | 5/2005 | Katayama |
| 6,908,404 B1 | 6/2005 | Gard |
| 6,923,729 B2 | 8/2005 | McGinty et al. |
| 7,004,848 B2 | 2/2006 | Konow |
| 7,021,140 B2 | 4/2006 | Perkins |
| 7,034,694 B2 | 4/2006 | Yamaguchi et al. |
| 7,037,198 B2 | 5/2006 | Hameen-Anttila |
| 7,092,846 B2 | 8/2006 | Vock et al. |
| 7,118,498 B2 | 10/2006 | Meadows et al. |
| 7,121,962 B2 | 10/2006 | Reeves |
| 7,143,639 B2 | 12/2006 | Gobush |
| 7,160,200 B2 | 1/2007 | Grober |
| 7,175,177 B2 | 2/2007 | Meifu et al. |
| 7,205,894 B1 | 4/2007 | Savage |
| 7,212,943 B2 | 5/2007 | Aoshima et al. |
| 7,219,033 B2 | 5/2007 | Kolen |
| 7,234,351 B2 | 6/2007 | Perkins |
| 7,264,554 B2 | 9/2007 | Bentley |
| 7,283,647 B2 | 10/2007 | McNitt |
| 7,421,369 B2 | 9/2008 | Clarkson |
| 7,433,805 B2 | 10/2008 | Vock et al. |
| 7,457,439 B1 | 11/2008 | Madsen |
| 7,457,724 B2 | 11/2008 | Vock et al. |
| 7,492,367 B2 | 2/2009 | Mahajan et al. |
| 7,494,236 B2 | 2/2009 | Lim |
| 7,499,828 B2 | 3/2009 | Barton |
| 7,561,989 B2 | 7/2009 | Banks |
| 7,623,987 B2 | 11/2009 | Vock et al. |
| 7,627,451 B2 | 12/2009 | Vock et al. |
| 7,689,378 B2 | 3/2010 | Kolen |
| 7,713,148 B2 | 5/2010 | Sweeney |
| 7,731,598 B1 | 6/2010 | Kim et al. |
| 7,736,242 B2 | 6/2010 | Stites et al. |
| 7,771,263 B2 | 8/2010 | Telford |
| 7,780,450 B2 | 8/2010 | Tarry |
| 7,800,480 B1 | 9/2010 | Joseph et al. |
| 7,813,887 B2 | 10/2010 | Vock et al. |
| 7,831,212 B1 | 11/2010 | Balardeta et al. |
| 7,871,333 B1 | 1/2011 | Davenport |
| 7,966,154 B2 | 6/2011 | Vock et al. |
| 7,983,876 B2 | 7/2011 | Vock et al. |
| 8,036,826 B2 | 10/2011 | MacIntosh et al. |
| 8,117,888 B2 | 2/2012 | Chan et al. |
| 8,172,722 B2 | 5/2012 | Molyneux et al. |
| 8,231,506 B2 | 7/2012 | Molyneux et al. |

(56) References Cited

U.S. PATENT DOCUMENTS

| | | |
|---|---|---|
| 8,249,831 B2 | 8/2012 | Vock et al. |
| 8,257,191 B2 | 9/2012 | Stites et al. |
| 8,282,487 B2 | 10/2012 | Wilson et al. |
| 8,314,840 B1 | 11/2012 | Funk |
| 8,352,211 B2 | 1/2013 | Vock et al. |
| 8,400,548 B2 | 3/2013 | Bilbrey et al. |
| 8,425,292 B2 | 4/2013 | Lui et al. |
| 8,477,027 B2 | 7/2013 | Givens |
| 8,527,228 B2 | 9/2013 | Panagas |
| 8,565,483 B2 | 10/2013 | Nakaoka |
| 8,589,114 B2 | 11/2013 | Papadourakis |
| 8,696,482 B1 | 4/2014 | Pedenko et al. |
| 8,723,986 B1 | 5/2014 | Merrill |
| 8,725,452 B2 | 5/2014 | Han |
| 8,764,576 B2 | 7/2014 | Takasugi |
| 8,781,610 B2 | 7/2014 | Han |
| 8,831,905 B2 | 9/2014 | Papadourakis |
| 8,876,621 B2 | 11/2014 | Shibuya |
| 8,888,603 B2 | 11/2014 | Sato et al. |
| 8,905,856 B2 | 12/2014 | Parke et al. |
| 8,929,709 B2 | 1/2015 | Lokshin |
| 8,944,932 B2 | 2/2015 | Sato et al. |
| 8,944,939 B2 | 2/2015 | Clark et al. |
| 8,956,238 B2 | 2/2015 | Boyd et al. |
| 8,988,341 B2 | 3/2015 | Lin et al. |
| 8,989,441 B2 | 3/2015 | Han et al. |
| 9,032,794 B2 | 5/2015 | Perkins et al. |
| 9,060,682 B2 | 6/2015 | Lokshin |
| 9,146,134 B2 | 9/2015 | Lokshin et al. |
| 9,646,199 B2 | 5/2017 | Bose et al. |
| 9,656,122 B2 | 5/2017 | Papadourakis |
| 9,694,267 B1 | 7/2017 | Thornbrue et al. |
| 10,124,230 B2 | 11/2018 | Thornbrue et al. |
| 2001/0029207 A1 | 10/2001 | Cameron et al. |
| 2001/0035880 A1 | 11/2001 | Musatov et al. |
| 2001/0045904 A1 | 11/2001 | Silzer, Jr. |
| 2001/0049636 A1 | 12/2001 | Hudda et al. |
| 2002/0004723 A1 | 1/2002 | Meifu et al. |
| 2002/0019677 A1 | 2/2002 | Lee |
| 2002/0049507 A1 | 4/2002 | Hameen-Anttila |
| 2002/0052750 A1 | 5/2002 | Hirooka |
| 2002/0064764 A1 | 5/2002 | Fishman |
| 2002/0072815 A1 | 6/2002 | McDonough et al. |
| 2002/0077189 A1 | 6/2002 | Tuer et al. |
| 2002/0082775 A1 | 6/2002 | Meadows et al. |
| 2002/0115046 A1 | 8/2002 | McNitt et al. |
| 2002/0126157 A1 | 9/2002 | Farago et al. |
| 2002/0151994 A1 | 10/2002 | Sisco |
| 2002/0173364 A1 | 11/2002 | Boscha |
| 2002/0177490 A1 | 11/2002 | Yong et al. |
| 2002/0188359 A1 | 12/2002 | Morse |
| 2003/0008722 A1 | 1/2003 | Konow |
| 2003/0073518 A1 | 4/2003 | Marty |
| 2003/0074659 A1 | 4/2003 | Louzoun |
| 2003/0109322 A1 | 6/2003 | Funk et al. |
| 2003/0163287 A1 | 8/2003 | Vock et al. |
| 2003/0191547 A1 | 10/2003 | Morse |
| 2003/0208830 A1 | 11/2003 | Marmaropoulos |
| 2004/0028258 A1 | 2/2004 | Naimark et al. |
| 2004/0033843 A1 | 2/2004 | Miller |
| 2004/0044493 A1 | 3/2004 | Coulthard |
| 2004/0147329 A1 | 7/2004 | Meadows et al. |
| 2004/0227676 A1 | 11/2004 | Kim et al. |
| 2004/0248676 A1 | 12/2004 | Taylor |
| 2005/0021292 A1 | 1/2005 | Vock et al. |
| 2005/0023763 A1 | 2/2005 | Richardson |
| 2005/0032582 A1 | 2/2005 | Mahajan et al. |
| 2005/0054457 A1 | 3/2005 | Eyestone et al. |
| 2005/0156068 A1 | 7/2005 | Ivans |
| 2005/0203430 A1 | 9/2005 | Williams et al. |
| 2005/0213076 A1 | 9/2005 | Saegusa |
| 2005/0215340 A1 | 9/2005 | Stites et al. |
| 2005/0227775 A1 | 10/2005 | Cassady et al. |
| 2005/0261073 A1 | 11/2005 | Farrington, Jr. et al. |
| 2005/0268704 A1 | 12/2005 | Bissonnette et al. |
| 2005/0272516 A1 | 12/2005 | Gobush |
| 2005/0282650 A1 | 12/2005 | Miettinen et al. |
| 2005/0288119 A1 | 12/2005 | Wang et al. |
| 2006/0020177 A1 | 1/2006 | Seo et al. |
| 2006/0025229 A1 | 2/2006 | Mahajan et al. |
| 2006/0038657 A1 | 2/2006 | Denison et al. |
| 2006/0063600 A1 | 3/2006 | Grober |
| 2006/0068928 A1 | 3/2006 | Nagy |
| 2006/0084516 A1 | 4/2006 | Eyestone et al. |
| 2006/0109116 A1 | 5/2006 | Keays |
| 2006/0122002 A1 | 6/2006 | Konow |
| 2006/0166738 A1 | 7/2006 | Eyestone et al. |
| 2006/0189389 A1 | 8/2006 | Hunter et al. |
| 2006/0199659 A1 | 9/2006 | Caldwell |
| 2006/0247070 A1 | 11/2006 | Funk et al. |
| 2006/0250745 A1 | 11/2006 | Butler et al. |
| 2006/0270450 A1 | 11/2006 | Garratt et al. |
| 2006/0276256 A1 | 12/2006 | Storek |
| 2006/0284979 A1 | 12/2006 | Clarkson |
| 2006/0293112 A1 | 12/2006 | Yi |
| 2007/0052807 A1 | 3/2007 | Zhou et al. |
| 2007/0062284 A1 | 3/2007 | Machida |
| 2007/0081695 A1 | 4/2007 | Foxlin et al. |
| 2007/0087866 A1 | 4/2007 | Meadows et al. |
| 2007/0099715 A1 | 5/2007 | Jones et al. |
| 2007/0111811 A1 | 5/2007 | Grober |
| 2007/0129178 A1 | 6/2007 | Reeves |
| 2007/0135225 A1 | 6/2007 | Nieminen |
| 2007/0135237 A1 | 6/2007 | Reeves |
| 2007/0219744 A1 | 9/2007 | Kolen |
| 2007/0265105 A1 | 11/2007 | Barton |
| 2007/0270214 A1 | 11/2007 | Bentley |
| 2007/0298896 A1 | 12/2007 | Nusbaum |
| 2008/0027502 A1 | 1/2008 | Ransom |
| 2008/0085778 A1 | 4/2008 | Dugan |
| 2008/0090703 A1 | 4/2008 | Rosenberg |
| 2008/0108456 A1 | 5/2008 | Bonito |
| 2008/0164999 A1 | 7/2008 | Otto |
| 2008/0182685 A1 | 7/2008 | Marty et al. |
| 2008/0190202 A1 | 8/2008 | Kulach et al. |
| 2008/0211768 A1* | 9/2008 | Breen .................. G06F 3/012 345/157 |
| 2008/0234935 A1 | 9/2008 | Wolf et al. |
| 2008/0280642 A1 | 11/2008 | Coxhill et al. |
| 2008/0284979 A1 | 11/2008 | Yee et al. |
| 2008/0285805 A1 | 11/2008 | Luinge et al. |
| 2009/0002316 A1 | 1/2009 | Rofougaran |
| 2009/0017944 A1 | 1/2009 | Savarese et al. |
| 2009/0029754 A1 | 1/2009 | Slocum et al. |
| 2009/0033741 A1 | 2/2009 | Oh et al. |
| 2009/0036237 A1 | 2/2009 | Nipper et al. |
| 2009/0048044 A1 | 2/2009 | Oleson et al. |
| 2009/0055820 A1 | 2/2009 | Huang |
| 2009/0088276 A1 | 4/2009 | Solheim et al. |
| 2009/0111602 A1 | 4/2009 | Savarese et al. |
| 2009/0131190 A1 | 5/2009 | Kimber |
| 2009/0137333 A1 | 5/2009 | Lin et al. |
| 2009/0144785 A1 | 6/2009 | Walker et al. |
| 2009/0174676 A1 | 7/2009 | Westerman |
| 2009/0177097 A1 | 7/2009 | Ma et al. |
| 2009/0191846 A1 | 7/2009 | Shi |
| 2009/0209343 A1 | 8/2009 | Foxlin et al. |
| 2009/0209358 A1 | 8/2009 | Niegowski |
| 2009/0213134 A1 | 8/2009 | Stephanick et al. |
| 2009/0222163 A1 | 9/2009 | Plante |
| 2009/0233735 A1 | 9/2009 | Savarese et al. |
| 2009/0254276 A1 | 10/2009 | Faulkner et al. |
| 2009/0254971 A1 | 10/2009 | Herz et al. |
| 2009/0299232 A1 | 12/2009 | Lanfermann et al. |
| 2010/0049468 A1 | 2/2010 | Papadourakis |
| 2010/0062869 A1 | 3/2010 | Chung et al. |
| 2010/0063778 A1 | 3/2010 | Schrock et al. |
| 2010/0063779 A1 | 3/2010 | Schrock et al. |
| 2010/0091112 A1 | 4/2010 | Veeser et al. |
| 2010/0093458 A1 | 4/2010 | Davenport et al. |
| 2010/0099509 A1 | 4/2010 | Ahem et al. |
| 2010/0103269 A1 | 4/2010 | Wilson et al. |
| 2010/0113174 A1 | 5/2010 | Ahern |
| 2010/0121227 A1 | 5/2010 | Stirling et al. |

(56) References Cited

U.S. PATENT DOCUMENTS

| | | |
|---|---|---|
| 2010/0121228 A1 | 5/2010 | Stirling et al. |
| 2010/0130298 A1 | 5/2010 | Dugan et al. |
| 2010/0144414 A1 | 6/2010 | Edis et al. |
| 2010/0144456 A1 | 6/2010 | Ahern |
| 2010/0144457 A1 | 6/2010 | Kim |
| 2010/0178994 A1 | 7/2010 | Do et al. |
| 2010/0201512 A1 | 8/2010 | Stirling et al. |
| 2010/0204616 A1 | 8/2010 | Shears et al. |
| 2010/0216564 A1 | 8/2010 | Stites et al. |
| 2010/0222152 A1 | 9/2010 | Jaekel et al. |
| 2010/0308105 A1 | 12/2010 | Savarese et al. |
| 2010/0309097 A1 | 12/2010 | Raviv et al. |
| 2010/0323794 A1 | 12/2010 | Su |
| 2011/0004871 A1 | 1/2011 | Liu |
| 2011/0029235 A1 | 2/2011 | Berry |
| 2011/0037778 A1 | 2/2011 | Deng et al. |
| 2011/0050864 A1 | 3/2011 | Bond |
| 2011/0052005 A1 | 3/2011 | Selner |
| 2011/0053688 A1 | 3/2011 | Crawford |
| 2011/0075341 A1 | 3/2011 | Lau et al. |
| 2011/0081981 A1 | 4/2011 | Okamoto |
| 2011/0126184 A1 | 5/2011 | Lisboa |
| 2011/0165998 A1 | 7/2011 | Lau et al. |
| 2011/0195780 A1 | 8/2011 | Lu |
| 2011/0230273 A1 | 9/2011 | Niegowski et al. |
| 2011/0230274 A1 | 9/2011 | Lafortune et al. |
| 2011/0230985 A1 | 9/2011 | Niegowski et al. |
| 2011/0230986 A1 | 9/2011 | Lafortune |
| 2011/0238308 A1 | 9/2011 | Miller et al. |
| 2011/0305369 A1 | 12/2011 | Bentley |
| 2012/0004034 A1* | 1/2012 | Pope .............. A63F 13/428 463/36 |
| 2012/0023354 A1 | 1/2012 | Chino |
| 2012/0052972 A1 | 3/2012 | Bentley |
| 2012/0088544 A1* | 4/2012 | Bentley .............. A63F 13/06 455/556.1 |
| 2012/0115626 A1 | 5/2012 | Davenport |
| 2012/0115682 A1 | 5/2012 | Homsi |
| 2012/0116548 A1 | 5/2012 | Goree et al. |
| 2012/0120572 A1 | 5/2012 | Bentley |
| 2012/0142415 A1* | 6/2012 | Lindsay .............. H04N 5/2224 463/33 |
| 2012/0157241 A1 | 6/2012 | Nomura et al. |
| 2012/0179418 A1 | 7/2012 | Takasugi et al. |
| 2012/0179742 A1 | 7/2012 | Acharya et al. |
| 2012/0191405 A1 | 7/2012 | Molyneux et al. |
| 2012/0295726 A1 | 11/2012 | Cherbini |
| 2012/0316004 A1 | 12/2012 | Shibuya |
| 2013/0029791 A1 | 1/2013 | Rose et al. |
| 2013/0095924 A1* | 4/2013 | Geisner ............. G09B 19/0038 463/32 |
| 2013/0095941 A1 | 4/2013 | Bentley et al. |
| 2013/0110415 A1 | 5/2013 | Davis et al. |
| 2013/0128022 A1 | 5/2013 | Bose et al. |
| 2013/0173212 A1 | 7/2013 | Saiki et al. |
| 2013/0178304 A1 | 7/2013 | Chan |
| 2013/0191063 A1 | 7/2013 | Nomura |
| 2013/0225309 A1 | 8/2013 | Bentley et al. |
| 2013/0245966 A1 | 9/2013 | Burroughs et al. |
| 2013/0267335 A1 | 10/2013 | Boyd et al. |
| 2013/0271602 A1 | 10/2013 | Bentley et al. |
| 2013/0281223 A1* | 10/2013 | Lee ................... A63B 69/3658 473/156 |
| 2013/0298668 A1 | 11/2013 | Sato |
| 2013/0319113 A1 | 12/2013 | Mizuta |
| 2013/0330054 A1 | 12/2013 | Lokshin |
| 2013/0332004 A1 | 12/2013 | Gompert et al. |
| 2013/0343729 A1 | 12/2013 | Rav-Acha et al. |
| 2013/0346013 A1 | 12/2013 | Lokshin |
| 2014/0019083 A1 | 1/2014 | Nakaoka |
| 2014/0100048 A1 | 4/2014 | Ota et al. |
| 2014/0100049 A1 | 4/2014 | Ota et al. |
| 2014/0100050 A1 | 4/2014 | Ota et al. |
| 2014/0135139 A1 | 5/2014 | Shibuya et al. |
| 2014/0156214 A1 | 6/2014 | Nomura |
| 2014/0172873 A1 | 6/2014 | Varoglu et al. |
| 2014/0200092 A1 | 7/2014 | Parke et al. |
| 2014/0200094 A1 | 7/2014 | Parke et al. |
| 2014/0213382 A1 | 7/2014 | Kang et al. |
| 2014/0229135 A1 | 8/2014 | Nomura |
| 2014/0229138 A1 | 8/2014 | Goree et al. |
| 2014/0257743 A1 | 9/2014 | Lokshin et al. |
| 2014/0257744 A1 | 9/2014 | Lokshin et al. |
| 2014/0295982 A1 | 10/2014 | Shibuya |
| 2014/0334796 A1 | 11/2014 | Galant et al. |
| 2014/0376876 A1 | 12/2014 | Bentley et al. |
| 2014/0378239 A1 | 12/2014 | Sato et al. |
| 2014/0379293 A1 | 12/2014 | Sato |
| 2014/0379294 A1 | 12/2014 | Shibuya et al. |
| 2014/0379295 A1 | 12/2014 | Sato et al. |
| 2015/0007658 A1 | 1/2015 | Ishikawa et al. |
| 2015/0012240 A1 | 1/2015 | Sato |
| 2015/0042481 A1 | 2/2015 | Nomura |
| 2015/0098688 A1 | 4/2015 | Lokshin |
| 2015/0124048 A1 | 5/2015 | King |
| 2015/0131845 A1 | 5/2015 | Forouhar et al. |
| 2015/0154452 A1 | 6/2015 | Bentley et al. |
| 2015/0256689 A1 | 9/2015 | Erkkila et al. |
| 2015/0348591 A1 | 12/2015 | Kaps et al. |
| 2017/0061817 A1 | 3/2017 | Mettler May |
| 2018/0021648 A1 | 1/2018 | Thornbrue et al. |
| 2018/0021653 A1 | 1/2018 | Thornbrue et al. |
| 2018/0070056 A1 | 3/2018 | DeAngelis et al. |

FOREIGN PATENT DOCUMENTS

| | | |
|---|---|---|
| EP | 2652738 | 10/2013 |
| EP | 2781240 | 9/2014 |
| JP | 2002210055 A | 7/2002 |
| JP | 2004207985 | 7/2004 |
| JP | 2005176030 | 6/2005 |
| JP | 2011000367 | 1/2011 |
| JP | 2012196241 | 10/2012 |
| JP | 2013188426 | 9/2013 |
| KR | 10-20030085275 | 11/2003 |
| KR | 10-20060041060 | 5/2006 |
| KR | 10-20070119018 | 12/2007 |
| KR | 10-20100074068 | 7/2010 |
| KR | 101079319 | 6/2011 |
| KR | 10-20100020131 | 9/2011 |
| WO | 1994027683 | 12/1994 |
| WO | 2007130057 A1 | 11/2007 |
| WO | 2009056688 A1 | 5/2009 |
| WO | 2011057194 | 5/2011 |
| WO | 2014085744 A1 | 6/2014 |

OTHER PUBLICATIONS

Obuchoski, Joe, "Tiger Woods PGA Tour 2010 Gameplay (Wii)", retrieved from Youtube on Jul. 3, 2019 from Internet URL <https://www.youtube.com/watch?v=2NjzPJvyRJE>. (Year: 2009).*

International Search Report received in PCT/US2016/042668, dated Oct. 4, 2016, 21 pages.

International Search Report received in PCT/US2016/042671, dated Oct. 13, 2016, 17 pages.

International Search Report and Written Opinion received in PCT/US2016/042676, dated Oct. 24, 2016 (12 pages).

International Preliminary Report on Patentability received in PCT/US2015/026917, dated Nov. 3, 2016 (5 pages).

International Search Report received for PCT Application No. PCT/US2012/065716, dated Jan. 3, 2013, 10 pages.

myCaddie, 2009, retrieved on Sep. 26, 2012 from http://www.iMakePars.com, 4 pages.

Swing it See it Fix it, Improve Gold Swing, SwingSmart Golf Analyzer, retrieved on Sep. 26, 2012 from http://www.SwingSmart.com, 2 pages.

Learn how Swingbyte can improve your game, retrieved on Sep. 26, 2012 from http://www.swingbyte.com, 2 pages.

International Search Report received for PCT Application No. PCT/US2011/055173, dated Mar. 6, 2012, 8 pages.

(56) References Cited

OTHER PUBLICATIONS

International Search Report received for PCT Application No. PCT/US2011/049461, dated Feb. 23, 2012, 14 pages, 2012.
PCT Search Report, PCT/US2012/029310, dated Sep. 28, 2012, 3 pages.
IPRP, PCT/US2011/049461, dated Mar. 7, 2013, 6 pages.
IPRP, PCT/US2011/058182, dated Apr. 30, 2013, 5 pages.
IPER, PCT/US2011/055173, dated Apr. 25, 2013, 5 pages, (2013).
IPRP, PCT/US2012/065716, dated May 20, 2014, 6 pages.
International Search Report for PCT Application No. PCT/US2013/021999, dated Apr. 30, 2013, 8 pages.
International Search Report for PCT Application No. PCT/US2012/066915, dated Mar. 29, 2013, 10 pages.
International Search Report for PCT Application No. PCT/US2015/26896, dated Jul. 28, 2015, 15 pages.
International Search Report for PCT Application No. PCTUS2015/26917, dated Jul. 30, 2015, 16 pages.
The Nike+FuelBand User's Guide, rev 14, 26 pages, 2012.
UP by Jawbone Extended User Guide, 10 pages, 2012.
Armour39, Under Armour Guarantee, Getting Started, retrieved from the Internet on Jul. 12, 2013, 7 pages.
Armour39 Module & Chest Strap, retrieved from the Internet on Jul. 12, 2013, 6 pages.
miCoach Pacer User Manual, 31 pages, (2009).
Foreman et al. "A Comparative Analysis for the Measurement of Head Accelerations in Ice Hockey Helmets using Non-Accelerometer Based Systems," Nov. 19, 2012, 13 pages.
Reebok-CCM and MC10 to Launch Revolutionary Sports Impact Indicator, MC10 News (http://www.mc10inc.com/news/), Oct. 24, 2012, 3 pages.
CheckLight MC10 Overview, Reebok International Limited, Nov. 20, 2012, 7 pages.
Reebok and MC10 Team Up to Build CheckLight, a Head Impact Indicator (Hands-on), MC10 News (http://www.mc10inc.com/news/), Jan. 11, 2013, 1 pg.
TRACE—The Most Advanced Activity Monitor for Action Sports, webpage, retrieved on Aug. 6, 2013, 22 pages.
CheckLight, Sports/Activity Impact Indicator, User Manual, 13 pages, 2013, Reebok International Limited.
King, The Design and Application of Wireless Mems Inertial Measurement Units for The Measurement and Analysis of Golf Swings, 2008.
Grober, An Accelerometer Based Instrumentation of the Golf Club: Comparative Analysis of Golf Swings, 2009.
Gehrig et al, Visual Golf Club Tracking for Enhanced Swing Analysis, Computer Vision Lab, Lausanne, Switzerland, 2003.
Pocketpro Golf Designs, PocketPro Full Swing Analysis in Your Pocket, www.PocketPro.org, (2011).
Clemson University, Golf Shot Tutorial, http://www.webnucleo.org/home/online_tools/newton/0.4/html/about_this_tool/tutorials/golf_1.shp.cgi, retrieved on Nov. 10, 2011.
miCoach SPEED_CELL TM, User Manual, 23 pages, (2011).
Nike+iPod, User Guide, 32 pages (2010).
SureShotGPS SS9000X, Intelligent Touch, Instruction Manual, 25 page, 2011.
ActiveReplay, "TRACE—The Most Advanced Activity Monitor for Action Sports", http://www.kickstarter.com/projects/activereplay/trace-the-most-advanced-activity-monitor-for-actio, 13 pages, Oct 1, 2013.
Zepp Golfsense@Launch2011, https://www.youtube.com/watch?v=VnOcu8szjIk (video), Mar. 14, 2011.
Epson US Newsroom, "Epson America Enters Sports Wearables Market with Introduction of M-Tracer MT500GII Golf Swing Analyzer", www.news.epson.com, Jan. 5, 2015, 4 pages.
International Search Report and Written Opinion dated Dec. 22, 2015 received in PCTUS1561695, 7 pages.
Search Report Received in PCT2013021999 dated Jan. 21, 2016.
Patent Examination Report received in Australia Application No. 2011313952, dated Mar. 15, 2016, 5 pages.
"About Banjo" webpages retrieved from internet, dated 2015.

International Search Report and Written Opinion mailed in PCTUS1642674 dated Aug. 12, 2016, 9 pages.
Supplementary Partial European Search Report received from EP Application Serial No. 11820763.8, dated Aug. 8, 2017, 15 pages.
Supplementary Partial European Search Report received from EP Application Serial No. 11833159.4, dated Aug. 8, 2017, 15 pages.
David E. Culler, Et al., "Smart Sensors to Network the World", published in Scientific American Magazine, No. Jun. 2004, dated Jun. 1, 2004, pp. 85-91.
International Search Report and Written Opinion received in PCT/US2017/039209, dated Aug. 24, 2017, 7 pages.
Zepp Labs, Inc. v. Blast Motion, Inc. Petition for Inter Partes Review of U.S. Pat. No. 8,903,521 filed on Feb. 24, 2016, as IPR2016-00672, and accompanying Declaration of Dr. Steven M. Nesbit.
Zepp Labs, Inc. v. Blast Motion, Inc. Petition for Inter Partes Review of U.S. Pat. No. 9,039,527 filed on Feb. 24, 2016, as IPR2016-00674, and accompanying Declaration of Dr. Steven M. Nesbit.
Zepp Labs, Inc. v. Blast Motion, Inc. Petition for Inter Partes Review of U.S. Pat. No. 8,941,723 filed on Feb. 24, 2016, as IPR2016-00675, and accompanying Declaration of Dr. Steven M. Nesbit.
Zepp Labs, Inc. v. Blast Motion, Inc. Petition for Inter Partes Review of U.S. Pat. No. 8,905,855 filed on Feb. 24, 2016, as IPR2016-00676, and accompanying Declaration of Dr. Steven M. Nesbit.
Zepp Labs, Inc. v. Blast Motion, Inc. Petition for Inter Partes Review of U.S. Pat. No. 8,944,928 filed on Feb. 24, 2016, as IPR2016-00677, and accompanying Declaration of Dr. Steven M. Nesbit.
Chris Otto, et al, "System Architecture of a Wireless Body Area Sensor Network for Ubiquitous Health Monitoring", *Journal of Mobile Multimedia*, vol. 1, No. 4, Jan. 10, 2006, University of Alabama in Huntsville, 20 Pages.
Linx Technologies "High Performance RF Module: Hp3 Series Transmitter Module Data Guide Description", Jul. 27, 2011, 13 pages.
Roger Allan, "Wireless Sensor Architectures Uses Bluetooth Standard", www.electronicdesign.com/communications/wireless-sensor-architecture-uses-bluetooth-standard, Aug. 7, 2000, 5 pages.
Don Tuite, "Motion-Sensing MEMS Gyros and Accelerometers are Everywhere", www.electronicdesign.com/print/analog/motion-sensing-mems-gyros-and-accelerometers-are-everywhere, Jul. 9, 2009, 6 pages.
InvenSense News Release, "InvenSense Unveils World's $1^{st}$ IMU Solution for Consumer Applications", ir.invensense.com, 2016, 2 Pages.
Dean Takahashi, "Facebook, Twitter, Last.fm coming to Xbox Live this Fall", Jun. 1, 2009, Webpage printout, 5 pages.
The iClub System, Products pages, www.iclub.net, 2001-2005, 5 pages.
Websters New College Dictionary, Definition of "Virtual Reality", Third Edition, 2005, 3 Pages.
SmartSwing, "SmartSwing Introduces Affordable Intelligent Golf Club", www.smartswinggolf.com, Jan. 2006, 2 pages.
Henrick Arfwedson, et al., "Ericsson's Bluetooth modules", Ericsson Review No. 4, 1999, 8 pages.
ZigBees, "Zigbee information", www.zigbees.com, 2015, 4 pages.
SolidState Technology, "MEMS enable smart golf clubs", www.electroiq.com, 2005, 3 pages.
IGN, "Japanese WII Price Release Date Revealed", www.ign.com, 2006, 1 page.
First Annual Better Golf Through Technology Conference 2006 webpage, www.bettergolfthroughtechnology.com, Massachusetts Institute of Technology, Cambridge Massachusetts, Feb. 2006, 1 page.
Concept2Rowing, "Training" web content, www.concept2.com, 2009, 1 page.
Expresso, Products pages, www.expresso.com/products, 2009, 2 pages.
Manish Kalia, et al., "Efficient Policies for Increasing Capacity in Bluetooth: An Indoor Pico-Cellular Wireless System", IBM India Research Laboratory, Indian Institute of Technology, 2000, 5 pages.

(56) References Cited

OTHER PUBLICATIONS

R. Rao, et al., "Demand-Based Bluetooth Scheduling", Pennsylvania State University, 2001, 13 pages.
International Preliminary Report on Patentability in PCTUS2015061695, dated Jun. 1, 2017, 5 pages.
European Search Report received in PCTUS2015026896 dated May 11, 2017, 13 pages.
Supplementary European Search Report received in 15860384.5 dated Jun. 21, 2018, 9 pages.
International Search Report and Written Opinion received in PCT/US18033757, dated Aug. 31, 2018, 8 pages.
International Search Report and Written Opinion received in PCT/US2017/52114, dated Oct. 3, 9 pages.
International Search Report and Written Opinion Received in PCT/US2017/37987, dated Nov. 9, 2017, 12 pages.
Supplementary Extended European Search Report received in 11820763.8 dated Nov. 13, 2017, 16 pages.
Supplementary Extended European Search Report received in 11833159.4 dated Nov. 6, 2017, 14 pages.
Supplementary Extended European Search Report received in 15782595.1 dated Nov. 27, 2017, 5 pages.
Supplemental Search Report received in EP1682529.5, dated Jun. 6, 2019, 7 pages.
International Preliminary Report on Patentability received in PCT/US2018/033757, dated Dec. 5, 2019, 6 pages, and transmittal thereof (1 page).

\* cited by examiner

MOTION MIRRORING SYSTEM THAT INCORPORATES VIRTUAL ENVIRONMENT CONSTRAINTS

BACKGROUND OF THE INVENTION

Field of the Invention

One or more embodiments setting forth the ideas described throughout this disclosure pertain to the field of motion capture sensors and displaying motion data in a virtual reality environment. More particularly, but not by way of limitation, one or more aspects of the invention enable a system that mirrors the motion of a real object with motion of a virtual object in a virtual environment, and that applies constraints defined in the virtual environment to the motion of the virtual object.

Description of the Related Art

Motion capture sensors and systems for analyzing motion data are known in the art, but these systems typically provide delayed analysis or playback after events occur. For example, there are systems that analyze the swing of a golf club using motion sensors attached to the club; these systems wait until a swing signature is detected, and then analyze the sensor data to reconstruct and diagnose the swing. Existing motion analysis systems do not provide real-time mirroring of the motion of an object such as a golf club with a display of a virtual club in a virtual environment. Such a mirroring system may provide valuable feedback to a user, who can observe the motion of the object from various angles while it is occurring. Observations of the motion in real-time may also be valuable for coaching and teaching. Real-time mirroring of the motion of an object may also provide the ability to use the object to control a virtual reality game; for example, a user may swing a real golf club to play a virtual round of golf on a virtual golf course. While there are virtual reality systems that provide gaming experiences, these systems typically require specialized game controllers. There are no known systems that use real sporting equipment as game controllers for virtual games for the associated sports, by attaching motion sensors to these real objects.

Real-time, continuous mirroring of the motion of an object in a virtual environment presents additional challenges since sensor data inaccuracies can accumulate over time. These challenges are less acute for systems that perform after the fact analysis of events, but they are critical for long-term motion mirroring. There are no known systems that address these accumulating errors by using combinations of redundant sensor data and constraints on the motion of virtual objects in a virtual environment.

For at least the limitations described above there is a need for a motion mirroring system that incorporates virtual environment constraints.

BRIEF SUMMARY OF THE INVENTION

Embodiments of the invention enable a motion mirroring system that generates and animates a virtual object in response to motion of a physical object equipped with motion sensors. The virtual object motion may take into account constraints defined for the virtual environment, such as for example regions the virtual object should remain in or remain near. The mirroring of physical object motion on a virtual environment display may be used for example for coaching or training, for playing virtual reality games, or for continuous feedback to a user.

One or more embodiments of the system may include a motion capture element (or several such elements) that may be coupled to a moveable, physical object. The motion capture element may include one or more sensors, a microprocessor to collect and transmit sensor data, and a communication interface for transmission of the data. The communication interface may be wireless, wired, or a combination thereof. Sensors may for example capture data related to any or all of the moveable object's position, orientation, linear velocity, linear acceleration, angular velocity, or angular acceleration. Sensors may capture additional or alternate data such as for example pressure, temperature, stress, strain, or shock.

The system may also include a computer that receives sensor data over another communication interface. The computer may be any device or combination of devices that can receive and process data, including for example, without limitation, a desktop computer, a laptop computer, a notebook computer, a tablet computer, a server, a mobile phone, a smart phone, a smart watch, smart glasses, a virtual reality headset, a microprocessor, or a network of any of these devices. In one or more embodiments the computer and the microprocessor of the motion capture element may coincide. The computer may access a memory (which may be local or remote, or a combination thereof) that contains a virtual environment state. The virtual environment state may define a virtual environment that includes a virtual object that represents the physical moveable object. The memory may also include one or more constraints on the position, orientation, or other characteristics of the virtual object in the virtual environment. For example, without limitation, constraints may specify regions of the virtual environment space that the virtual object must remain in or near, or regions that it may not be in.

The computer may receive sensor data from the motion capture element, and may then calculate from the data the position and orientation of the moveable object in the real environment. Because these calculations may result in errors, including potentially accumulating errors over time, the computer may apply one or more corrections to the position and orientation, for example using redundancies in the sensor data. The computer may then transform the position and orientation of the moveable object into a position and orientation of the virtual object in the virtual environment. Rules and algorithms for this transformation may depend on the nature and purpose of the virtual environment; for example, in a virtual game, the transformations may place the virtual object in an appropriate location based on the state of the game. The computer may check whether the transformed position and orientation of the virtual object satisfy the constraints associated with the virtual environment. If they do not, the computer may apply corrections or additional transformations to enforce the constraints. The computer may then generate one or more images of the virtual environment and the virtual object, and transmit these images to a display for viewing. The calculations, corrections, transformation, and image generation may occur in real time or almost real time, so that motions of the physical object result in immediate or almost immediate corresponding motions of the virtual object on the display. For example, delays between motion of the physical object and corresponding mirrored motion of the virtual object on a display may be on the order of less than a half a second, or in some cases on the order of tens of milliseconds or less.

A moveable object tracked by a motion capture element may for example be a piece of equipment, an article of clothing, or a body part of a person. In one or more embodiments a piece of equipment may be a piece of sporting equipment used in a sports activity, such as for example, without limitation, equipment used in golf, tennis, badminton, racquetball, table tennis, squash, baseball, softball, cricket, hockey, field hockey, croquet, football, rugby, Australian rules football, soccer, volleyball, water polo, polo, basketball, lacrosse, billiards, horseshoes, shuffleboard, handball, bocce, bowling, dodgeball, kick ball, track and field events, curling, martial arts, boxing, archery, pistol shooting, rifle shooting, ice skating, gymnastics, surfing, skateboarding, snowboarding, skiing, windsurfing, roller blading, bicycling, or racing. The virtual environment in one or more embodiments may be a virtual game for an associated sports activity, with the virtual object representing a piece of equipment for that virtual game. For example, in a golf application, the moveable object may be a golf club, and the virtual environment may represent a virtual golf course in which the user plays a virtual round of golf; as the user moves the physical golf club, corresponding mirrored motions may be displayed by the system for the virtual golf club in the virtual golf course.

In one or more embodiments, sensors in a motion capture element may include one or more of accelerometers, rate gyroscopes, or magnetometers. These sensors may have any number of axes; for example, without limitation, 3-axis sensors may be used for applications that track motion in all directions. These sensors are illustrative; one or more embodiments may use any type or types of sensors to track any aspect of an object's position, orientation, motion, or other characteristics.

In one or more embodiments, the sensor data may include redundant information that may be used to improve or correct calculations of the moveable object's position or orientation. For example, one or more embodiments may obtain redundant orientation information using three techniques: integration of angular velocity data from a gyroscope, measurement of the object's orientation relative to the Earth's magnetic field from a magnetometer, and measurement of the object's orientation relative to the Earth's gravitational field from an accelerometer (during periods of time when the object is substantially stationary, for example). One or more embodiments may for example use the first calculation (integration of angular velocity) to obtain an initial estimate of an object's orientation, and may then apply corrections based on differences between predicted gravity and magnetic field vectors and values measured from an accelerometer and a magnetometer, respectively.

For example, without limitation, one or more embodiments may apply corrections by calculating a magnetic rotational error between the predicted magnetic field vector based on angular velocity integration and the measured magnetic field vector, and by calculating a gravitational rotational error between the predicted gravitational field vector based on angular velocity integration and the measured gravitational field vector. One or more embodiments may then apply a fraction of either or both of the magnetic rotational error and the gravitational rotational error to the calculated orientation, to form a corrected orientation.

In one or more embodiments an image of the virtual object in the virtual environment may be formed by a virtual camera that can be positioned and oriented in the virtual environment. Users or the system may be able to modify or configure the position and orientation of this virtual camera, for example to show the motion of the object from different perspectives.

In one or more embodiments, constraints on the position, orientation, motion, or other characteristics of the virtual object in the virtual environment may for example describe or define regions of the virtual environment that the virtual object must remain in or remain near. Constraints may describe regions of the virtual environment that the virtual object must not be in or must not be near. Constraints may describe or define virtual barriers that the virtual object may not pass through. For example, without limitation, the virtual environment may define a ground surface that a virtual object must remain above and must not pass through. Constraints may for example describe or define maximum or minimum values for any function of an object's motion, position, or orientation; for example, constraints may limit the virtual object's maximum or minimum speed, acceleration, angular velocity, or angular acceleration. Constraints may describe or define limits on allowable orientations of a virtual object, for example by requiring that the virtual object must be facing in a particular direction or must not face in certain directions.

In one or more embodiments the motion mirroring system may be used for example to play a virtual game, where a user moves a physical object to control movement of a corresponding virtual piece of equipment in the virtual game. For example, the system may mirror motion of a physical golf club to move a virtual golf club that is used to play a game that simulates a round of golf on a virtual golf course. One or more embodiments that execute games may include one or more virtual game pieces in the virtual environment, such as for example a golf ball in a virtual golf game. In some games a virtual object (such as for example a virtual golf club) may be used to strike a virtual game piece (such as for example a virtual golf ball). The system may calculate the initial velocity of a virtual game piece (as well as other characteristics such as spin) by simulating the impact of the virtual object with the virtual game piece. For example, the initial velocity of a virtual golf ball may be calculated based on the velocity of a virtual golf club when it impacts the virtual golf ball. The velocity of the virtual object at impact may in turn be calculated based on the motion of the physical object corresponding to the virtual object.

In one or more embodiments the system may relocate the virtual object to a new location in response to events that occur in a virtual game or a virtual simulation. This relocation may occur automatically or in response to user input. For example, in an embodiment that mirrors the motion of a golf club to play a virtual golf game, the system may move the virtual golf club to the new location of the virtual golf ball after a shot, or to the start of a new hole once a previous hole is complete. In one or more embodiments the system may move the virtual object gradually from one position to a new position to avoid discontinuous jumps in the displayed position of the virtual object. In one or more embodiments the system may update the orientation of a virtual object to a new orientation in response to events that occur in a virtual game or a virtual simulation. For example, in a virtual golf game the system may automatically update the aim direction of a club to aim at the hole when the position of the virtual club changes to a new location where the ball lands or at the start of a new hole. As with changes in position, the system may change the orientation of the virtual object gradually to avoid discontinuous jumps in the displayed orientation of the virtual object.

BRIEF DESCRIPTION OF THE DRAWINGS

The above and other aspects, features and advantages of the ideas conveyed through this disclosure will be more apparent from the following more particular description thereof, presented in conjunction with the following drawings wherein.

DETAILED DESCRIPTION OF THE INVENTION

A motion mirroring system that incorporates virtual environment constraints will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
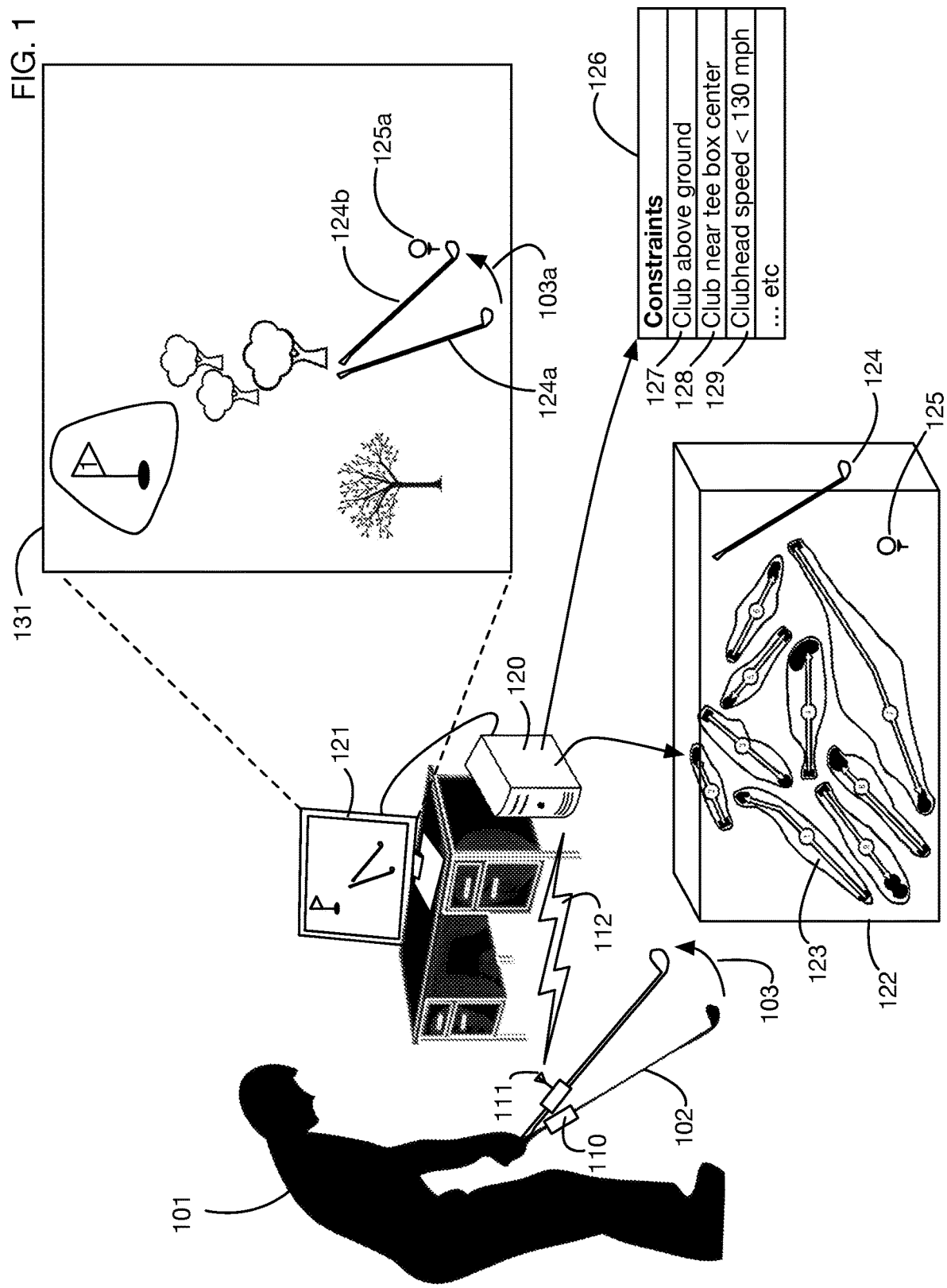
FIG. 1 illustrates an embodiment of a motion mirroring system that uses a motion sensor attached to a golf club; motion of the club is mirrored on a display that shows a virtual golf club moving in a virtual environment.

FIG. 1 shows an illustrative embodiment of the system that mirrors the motion of a golf club by displaying a virtual golf club whose motion is synchronized to the motion of the real golf club. User 101 is moving real golf club 102, which has an attached motion capture element 110 that measures motion of the club. One or more embodiments may mirror the motion of any object or objects, including for example, without limitation, pieces of equipment, articles of clothing, wearable objects, objects that are carried or held, objects that are thrown or caught, objects that are hit or struck, vehicles, objects that are driven or ridden, or parts of a user's body. Pieces of equipment may include for example, without limitation, equipment used in sports activities such as golf, tennis, badminton, racquetball, table tennis, squash, baseball, softball, cricket, hockey, field hockey, croquet, football, rugby, Australian rules football, soccer, volleyball, water polo, polo, basketball, lacrosse, billiards, horseshoes, shuffleboard, handball, bocce, bowling, dodgeball, kick ball, track and field events, curling, martial arts, boxing, archery, pistol shooting, rifle shooting, ice skating, gymnastics, surfing, skateboarding, snowboarding, skiing, windsurfing, roller blading, bicycling, and racing.

Motion capture element 110 measures one or more aspects of the position or orientation (or both) of object 102, or of changes thereto such as linear velocity, linear acceleration, angular velocity, or angular acceleration. Motion capture elements may use any sensing or measuring technologies to measure any physical quantity or quantities; these technologies may include but are not limited to inertial sensing technologies such as accelerometers and gyroscopes. Motion capture elements may include additional devices that may be physically separate from the motion capture element itself, such as transmitters or receivers (such as for example a GPS satellite) or cameras that observe the motion capture element. Any device or combination of devices that provides data that can be used to determine the motion of an object such as golf club 102 is in keeping with the spirit of the invention.

Motion capture element 110 collects motion data reflecting the motion 103 of the golf club, and transmits this data using communication interface 111 to a receiving computer 120 for analysis and display. In this illustrative example, communication interface 111 is a wireless transmitter. For example, transmitter 111 may send data over wireless channel 112 which may be for example, without limitation, a Bluetooth or Bluetooth Low Energy channel, an 802.11 channel, a cellular network, or any other wireless channel or network. One or more embodiments may use wired connections between motion capture element 110 and computer 120 instead of or in addition to wireless connections such as 112. One or more embodiments may use any desired media, networks, and protocols to transmit data.

Computer 120 receives sensor data from motion capture element 110 using a corresponding communication interface integrated into or accessible to the computer. Computer 120 may be any device or combination of devices that can receive and process the sensor data. For example, without limitation, computer 120 may include a desktop computer, a laptop computer, a notebook computer, a tablet computer, a server, a mobile phone, a smart phone, a smart watch, smart glasses, a virtual reality headset, a microprocessor, or a network of any of these devices. In one or more embodiments the computer may be part of or collocated with the motion capture element 110. The computer processes the sensor data received over channel 112 to analyze the motion of the object 102. The computer 120 accesses one or more memory or storage devices that contain a description 122 of a virtual environment. This memory or storage may be local, remote, or a combination thereof. The virtual environment 122 may for example include a description of terrain or surroundings such as a golf course, including a virtual golf hole 123. The virtual environment may also include a description of one or more virtual objects in the environment, such as virtual golf club 124 and virtual golf ball 125. In particular, one of these virtual objects may correspond to the real object 102 that is being moved. In the embodiment shown in FIG. 1, virtual golf club 124 in virtual environment 122 corresponds to and represents real golf club 102. While the virtual object 124 may represent real object 102, in one or more embodiments the size, shape, color, texture, materials, and appearance of the virtual object may not be identical to that of the real object. Computer 120 moves virtual object 124 in the virtual environment to mirror the motion 103 of physical object 102. The computer transmits one or more images to a display such as monitor 121 to show the mirrored motion in the virtual environment. For example, image 131 shown on display 121 shows an initial position and orientation 124a of virtual golf club 124. When user 101 makes real movement 103 of club 102, the system mirrors this motion with virtual motion 103a of virtual club 124 from position and orientation 124a to position and orientation 124b. The virtual club 124 is also positioned near virtual golf ball 125 which is located at position 125a, corresponding for example to a tee box of virtual hole 123. In one or more embodiments computer 120 modifies and updates the state of the virtual environment 122 in any desired manner based on data from motion capture element 110, or based on any other inputs for example from user 101 or from other users or systems.

In mirroring the motion such as 103 of a real object 102 in a virtual environment, one or more embodiments may apply one or more constraints on the motion. For example, in the embodiment of FIG. 1 the memory or storage of computer 120 also contains constraints 126 on the motion of the virtual golf club 124. These constraints may for example specify defined regions for the position of the virtual club, or limits on the club's orientation or motion. As an example, constraints 126 contain a constraint 127 that virtual club must be entirely above the ground, reflecting a physics-based constraint in the virtual environment. One or more embodiments may have similar constraints that prevent a virtual object from passing through a physical barrier or surface, such as a wall. In one or more embodiments these constraints may be used to transform the real position and orientation of a real object into a corresponding position and orientation of a virtual object. For example, constraint 128 places the position of the virtual club near the tee box of the virtual hole (such as 123) currently being played in the virtual environment. One or more embodiments may impose physical limits on characteristics of the motion, position, or orientation of a virtual object, such as the maximum speed constraint 129. Maximum or minimum constraints may be applied to any characteristic, including for example, without limitation, height, speed, velocity component in any direction, acceleration, angular velocity, or angular acceleration. Constraints may also be used to correct accumulated errors in the calculated position or orientation of an object, resulting for example from drift in inertial navigation, as discussed further below.

Figure 2:
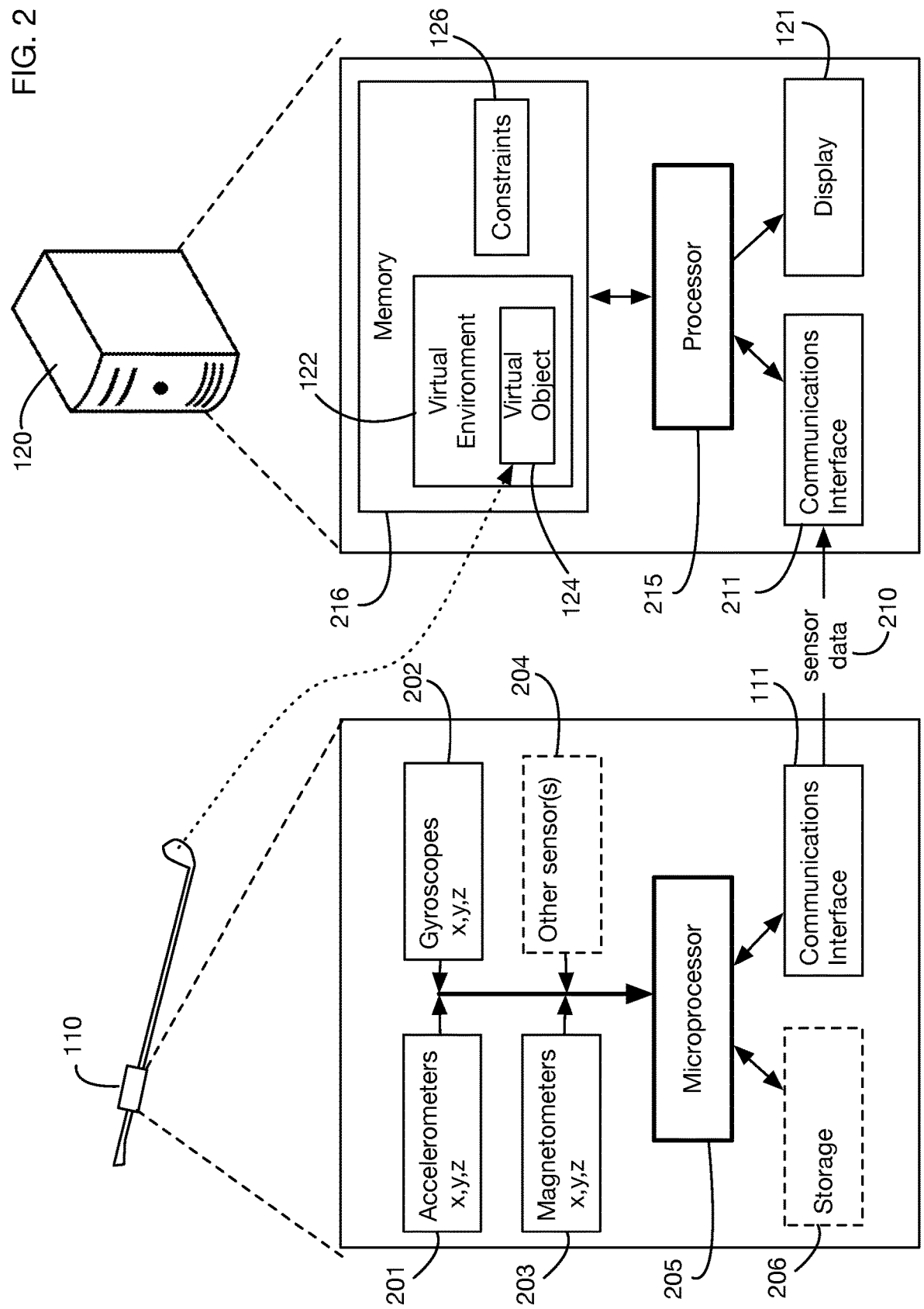
FIG. 2 shows an architectural block diagram of one or more embodiments of the system, including components of a motion sensor and of a computer that generates the virtual motion that mirrors the motion sensor data.

FIG. 2 shows a block diagram of the motion capture element and computer components of one or more embodiments. Motion capture element 110 may include a microprocessor 205 that coordinates obtaining and transmitting sensor data. Sensors may include for example accelerometers 201, rate gyroscopes 202, magnetometers 203, or other sensors 204 as desired. Any type or types of sensors may be used to provide information on position, orientation, or motion. In one or more embodiments the accelerometers, gyroscopes, magnetometers, or other sensors may have any number of axes. 3-axis configurations for example may be used to measure motion or orientation in any direction. In embodiments with motion constrained to fewer dimensions, fewer than three axes may be sufficient or appropriate.

Motion capture element 110 may have an optional storage device or devices 206. For example, in one or more embodiments sensor data may be buffered or recorded before transmission to a computer. Use of storage for buffering or recording is optional; one or more embodiments may transmit sensor data directly as soon as it is received, without buffering or recording the data. In one or more embodiments the microprocessor 205 may process data from sensors such as 201, 202, 203, and 204 prior to transmitting (or storing) the data. For example, without limitation, data may be compressed, filtered, integrated, rescaled, resampled, or transformed in any desired manner by the microprocessor 205. Sensor data 210 (or a transformed version of this data) is transmitted via communications interface 111 to computer 120.

Computer 120 may include a processor (or multiple processors) 215. The processor may access sensor data 210 received on communications interface 211. It may also access memory device or devices 216, which may contain for example the description and state of a virtual environment 122, including a virtual object 124 that may represent a real object being moved. The memory device may also contain constraints 126 on the position, orientation, or motion of the virtual object, or more generally any constraints on the state of the virtual environment. The memory device or devices may be local to computer 120, remote to the computer and accessed for example via a network connection, or any combination thereof. The processor 215 may update the state of the virtual environment 122 using sensor data 210, apply constraints 126, and generate images that are transmitted to display 121. Display 121 may be local to computer 120 or remote. One or more embodiments may include multiple displays, potentially showing for example different views of virtual environment 122. In one or more embodiments display 121 may be a stereographic display or any type of 3D display technology. In one or more embodiments the display or displays 121 may be integrated into a headset or into glasses or goggles.

Figure 3:
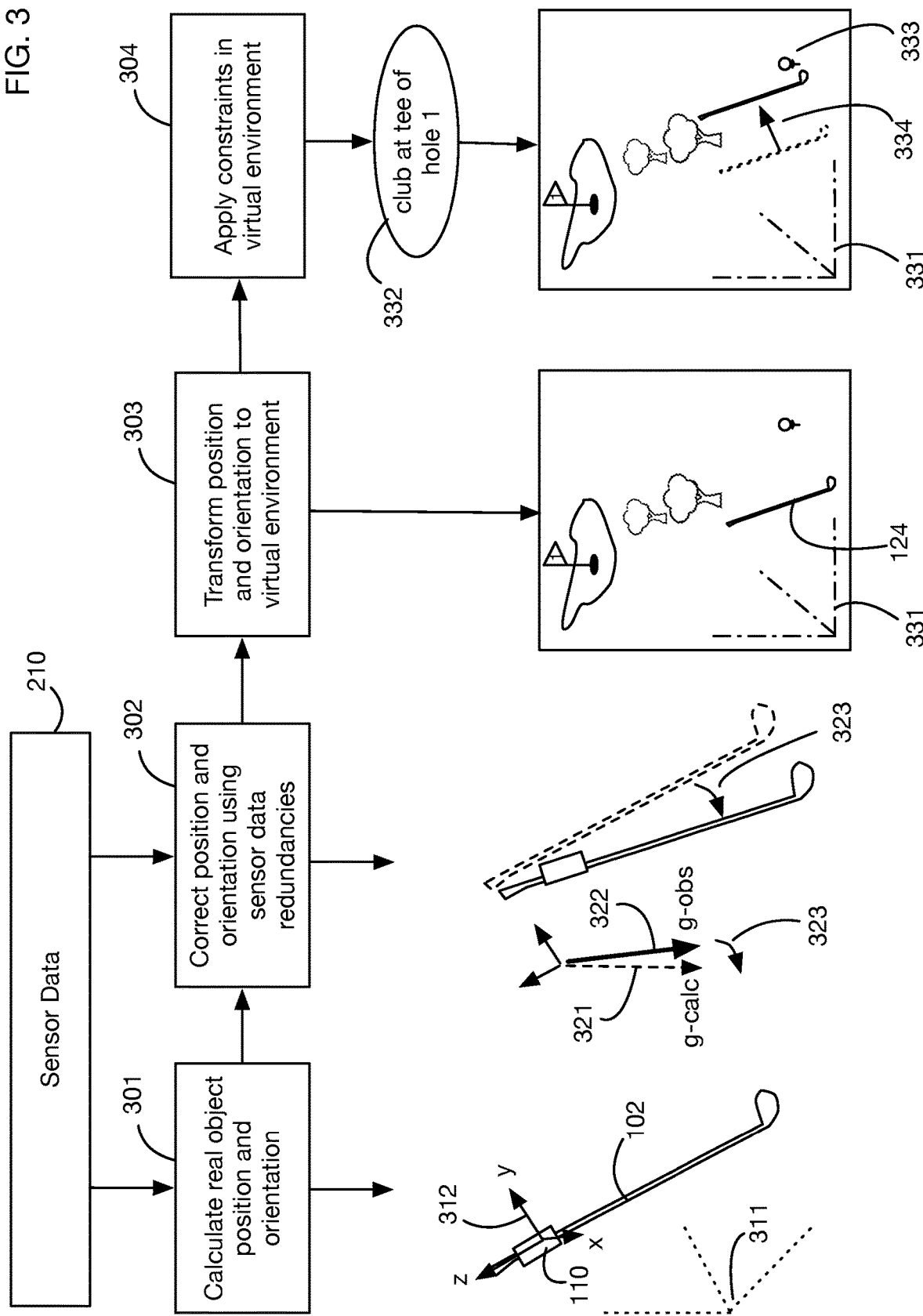
FIG. 3 shows a flow chart of an embodiment that applies both sensor data redundancies and virtual environment constraints to transform sensor data into the position and orientation of a virtual object.

FIG. 3 shows an illustrative sequence of steps that may be used in one or more embodiments to transform sensor data into a position and orientation of a virtual object. Sensor data 210 is received and is first used in step 301 to calculate the current position and orientation of the real object to which the motion capture element may be coupled. The specific calculations yielding position and orientation depend upon the type of sensor data 210 that is available. As a non-limiting example, if sensor data includes accelerometer and gyroscope information, inertial navigation algorithms known in the art may be applied to calculate position and orientation over time from the acceleration and angular velocity data. The result of calculations 301 defines the position and orientation 312 of the motion capture element 110 in coordinate system 311 that is fixed to the real environment in which object 102 moves. The position and orientation of object 102 (or any part thereof) may then be determined, for example using rigid body transformations known in the art.

In one or more embodiments, an initial calculation 301 of object position and orientation 312 may be subject to various errors. For example, as is known in the art, in inertial navigation using accelerometer and gyro data, calculated position and orientation may drift over time from their true values. One or more embodiments may therefore apply a step 302 to correct position and orientation using one or more redundancies in the sensor data 210. The specific corrections depend on the type of sensor data 210 and on the specific redundancies in the data. For example, continuing the inertial navigation example, an accelerometer and a gyroscope contain redundant information about the orientation of an object, since the gyroscope angular velocity can be integrated to form orientation, and the accelerometer can also provide a tilt reading when the object is stationary. In the embodiment illustrated in FIG. 3, the gravity vector predicted based on gyroscope integration is 321, but the observed gravity vector obtained from the accelerometer (assuming a stationary object) is vector 322. The rotational difference 323 between these values can be applied as a correction to the object orientation.

After corrections 302, step 303 may transform the position and orientation of the real object into the virtual environment. This transformation may depend for example on the state of the virtual environment. For example, in the golf example from FIG. 1, the virtual club 124 is positioned at various holes in the virtual golf course throughout the course of a virtual round. The transformation from real club position to virtual position therefore depends on which virtual hole the user is playing at that point in time. As a user advances to another hole, the position of the virtual club changes, without requiring the real user to move the physical golf club to a new location. Transformation 303 results in a position and orientation for virtual object 124 relative to a virtual environment coordinate system 331.

After transformation 303 to the virtual environment, one or more embodiments may perform step 304 to apply one or more constraints to the position, orientation, motion, or other characteristics of the virtual object. For example, constraint 332 may require that the virtual club 124 be located at or near the tee of the first hole (or more generally located at or near the ball's current position). Because of accumulated errors such as inertial drift (which may not be fully corrected by step 302), the position of the virtual club may need to be adjusted with a shift 334 to place it near the ball position 333, for example. Other constraints such as those illustrated in FIG. 1 may also be applied to the virtual object.

Figure 4:
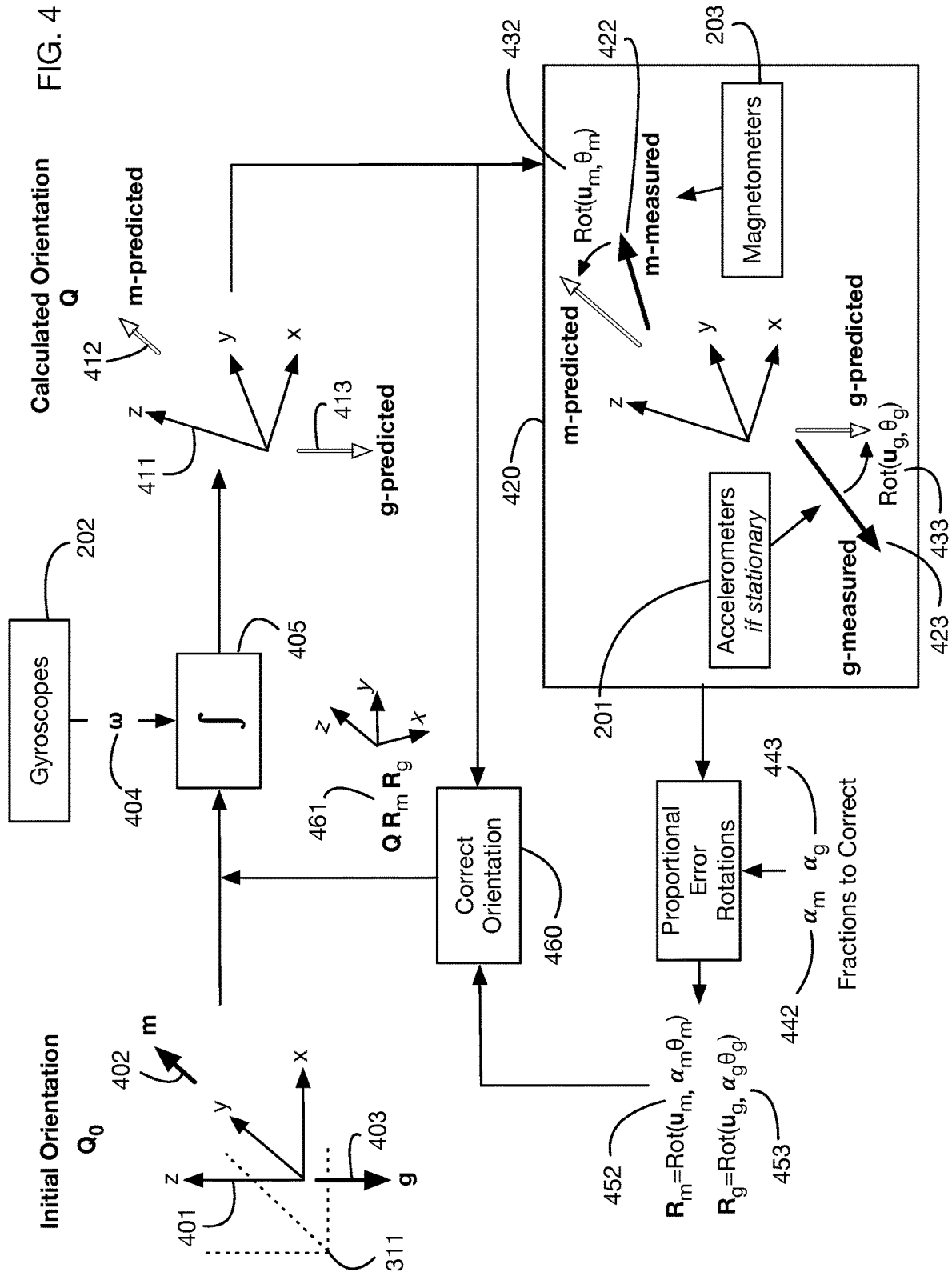
FIG. 4 illustrates an embodiment of the system that applies proportional error correction to orientation errors derived from redundant data obtained from a gyroscope combined with an accelerometer and a magnetometer.

FIG. 4 shows an illustrative embodiment that performs correction step 302 for orientation errors using sensor data redundancy in motion capture data from a 3-axis accelerometer, a 3-axis gyroscope, and a 3-axis magnetometer. The approach shown in FIG. 4 is illustrative; one or more embodiments may use any technique to perform error correction using any type of sensor data redundancy. For simplicity, the example illustrated in FIG. 4 begins with the initial orientation 401 ($Q_0$) of the motion capture element aligned with the coordinate system 311 of the real environment. In this reference frame, the Earth gravity vector 403 ($g$) points in the negative z direction, and for simplicity we illustrate the Earth's magnetic field vector 402 ($m$) pointing in the positive y direction. (The actual direction of the magnetic field vector depends on various factors including the latitude and longitude of the system.) Starting with this initial orientation 401, the system calculates updates to the orientation by integrating the angular velocity 404 ($\omega$) obtained from a 3-axis gyroscope 202. Using integration 405, an updated orientation 411 is calculated after each sensor data sample. (Integration of angular velocity to form orientation updates is known in the art, for example by integrating the differential equation $$\frac{dQ}{dt} = \omega^\times Q,$$

where Q is the orientation matrix and $\omega^\times$ is the cross product matrix formed from the angular velocity $\omega$.) Given the calculated orientation 411, predicted values can be estimated for the magnetic field vector 412 and the gravity vector 413. This prediction presumes that the orientation of the magnetic vector 412 in the fixed reference frame 311 is the same as its initial orientation 402, and that therefore the change in the magnetic vector measured in the sensor reference frame 411 is due only to the change in orientation. Similarly, the prediction presumes that that the orientation of the gravity vector 413 in the fixed reference frame 311 is the same as its initial orientation 403, and that therefore the change in the gravity vector measured in the sensor reference frame 411 is due only to the change in orientation.

Calculations 420 then use redundant sensor data to compare the predicted magnetic vector 412 and predicted gravity vector 413 to measured quantities. The measured magnetic vector 422 may for example be obtained from magnetometers 203. The measured gravity vector 423 may for example be obtained from accelerometers 201, provided that the system is stationary or substantially stationary (or not accelerating) when the measurement is made. In one or more embodiments the system may for example determine whether the system is sufficiently stationary to use the gravity vector measurement by testing the magnitude of the angular velocity; a low angular velocity may suggest that the system may be stationary. In one or more embodiments the system may for example also or alternatively determine whether the system is sufficiently stationary by testing the magnitude of the acceleration vector; an acceleration magnitude approximately equal to g (gravity acceleration) may suggest that the system may be stationary. By comparing the predicted and measured vectors, rotations 432 and 433 can be calculated that rotate the measured values into the predicted values. (For example, an axis for each of these rotations can be determined by taking the cross product of the predicted and measured vectors.) These rotations 432 and 433 represent the errors between the calculated orientation and the actual orientation.

In one or more embodiments one or both of the error rotations 432 and 433 may be applied to the current orientation with proportional scaling factors to shift the calculated orientation gradually towards the measured orientation. Applying only a portion of the error rotations to the orientation at each update cycle (or at selected update cycles) may for example provide a more robust solution when the measured gravity and magnetic vectors are also subject to possible errors. Fractions 442 and 443, respectively, are applied to rotations 432 and 433, yielding proportional error rotations 452 and 453 respectively. In this illustrative example the proportionality factors 442 and 443 are applied to the rotation angles ($\theta_m$ and $\theta_g$), and the rotation axes ($u_m$ and $u_g$) of rotations 432 and 433 are preserved. The rotations 452 and 453 are then applied in step 460 to the orientation 411, yielding a corrected orientation 461. In one or more embodiments one or both of the corrections 452 and 453 may be applied at every sensor sample. In one or more embodiments one or both of the corrections may be applied periodically but not at every sensor sample, for example at every tenth sample. In one or more embodiments one or both of the corrections may be applied when the angular magnitude of the error rotations 432 or 433 exceed a threshold.

Figure 5:
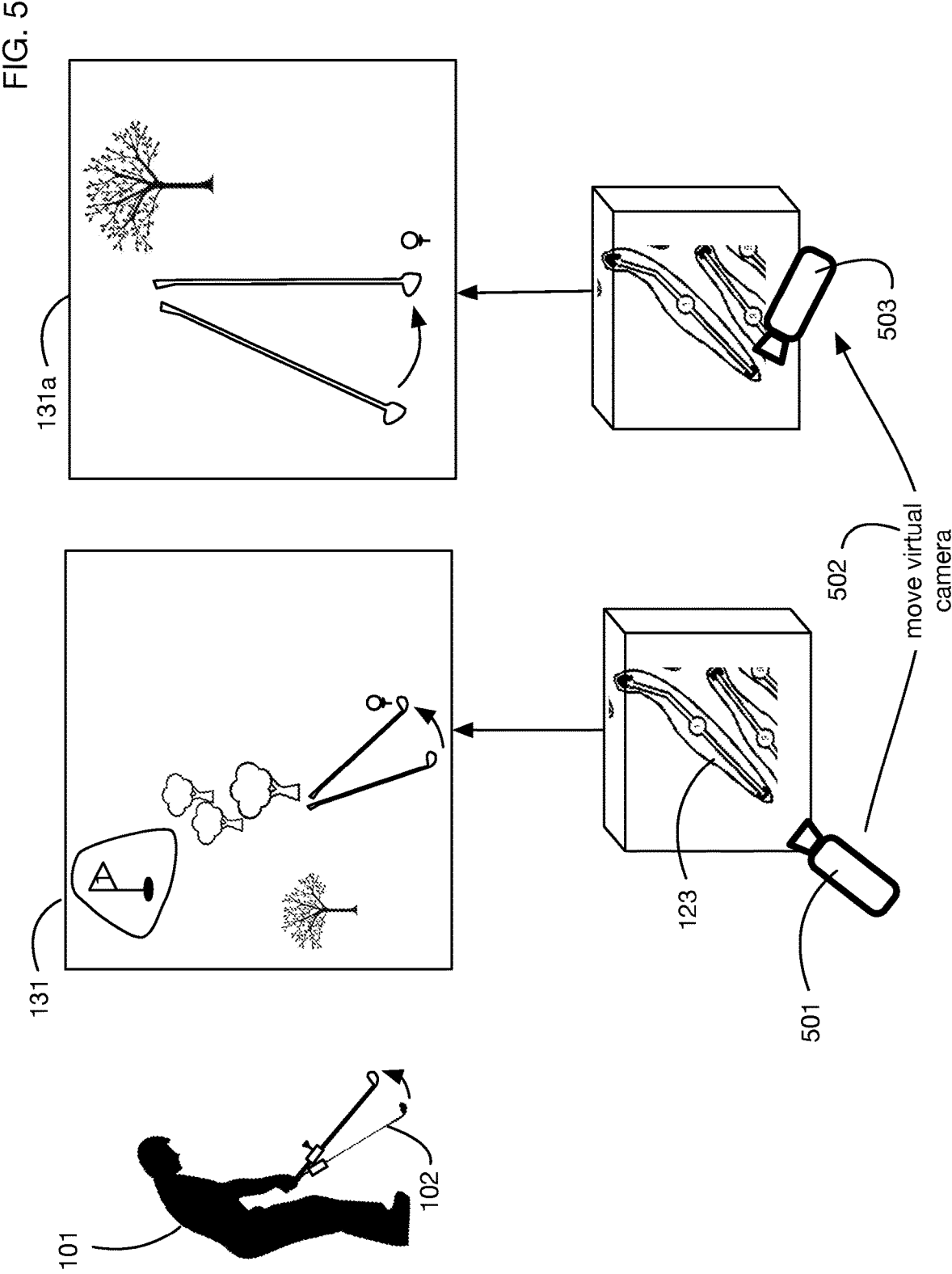
FIG. 5 illustrates an embodiment that supports changing the position and orientation of a virtual camera that generates a display of a virtual object in a virtual environment.

After possible correction using redundant sensor data, the position and orientation of a real object may be transformed to the virtual environment to form an image of a virtual object. In one or more embodiments the user or the system may be able to configure or modify the position and orientation in the virtual environment of a virtual camera that generates this image. FIG. 5 illustrates an embodiment with this capability. As in FIG. 1, user 101 moves real golf club 102, and this motion is mirrored on a display of a virtual golf club in a virtual environment. Image 131 shows the virtual golf club and the virtual environment from the perspective of a virtual camera 501, which in this example is positioned and oriented to be behind the golfer looking down the fairway of the virtual hole 123. The user (or the system, or another user) makes modification 502 to move the virtual camera to new position and orientation 503, which is to the right of the golfer. This new camera position and orientation results in modified image 131a of the virtual environment and of the virtual golf club. In one or more embodiments camera position and orientation may be configurable by a user. In one or more embodiments the system may generate changing virtual camera position and orientation to show the virtual environment from different angles as the motion is mirrored. In one or more embodiments the system may select an optimal virtual camera position and orientation, based for example on the motion of the real object.

Figure 6:
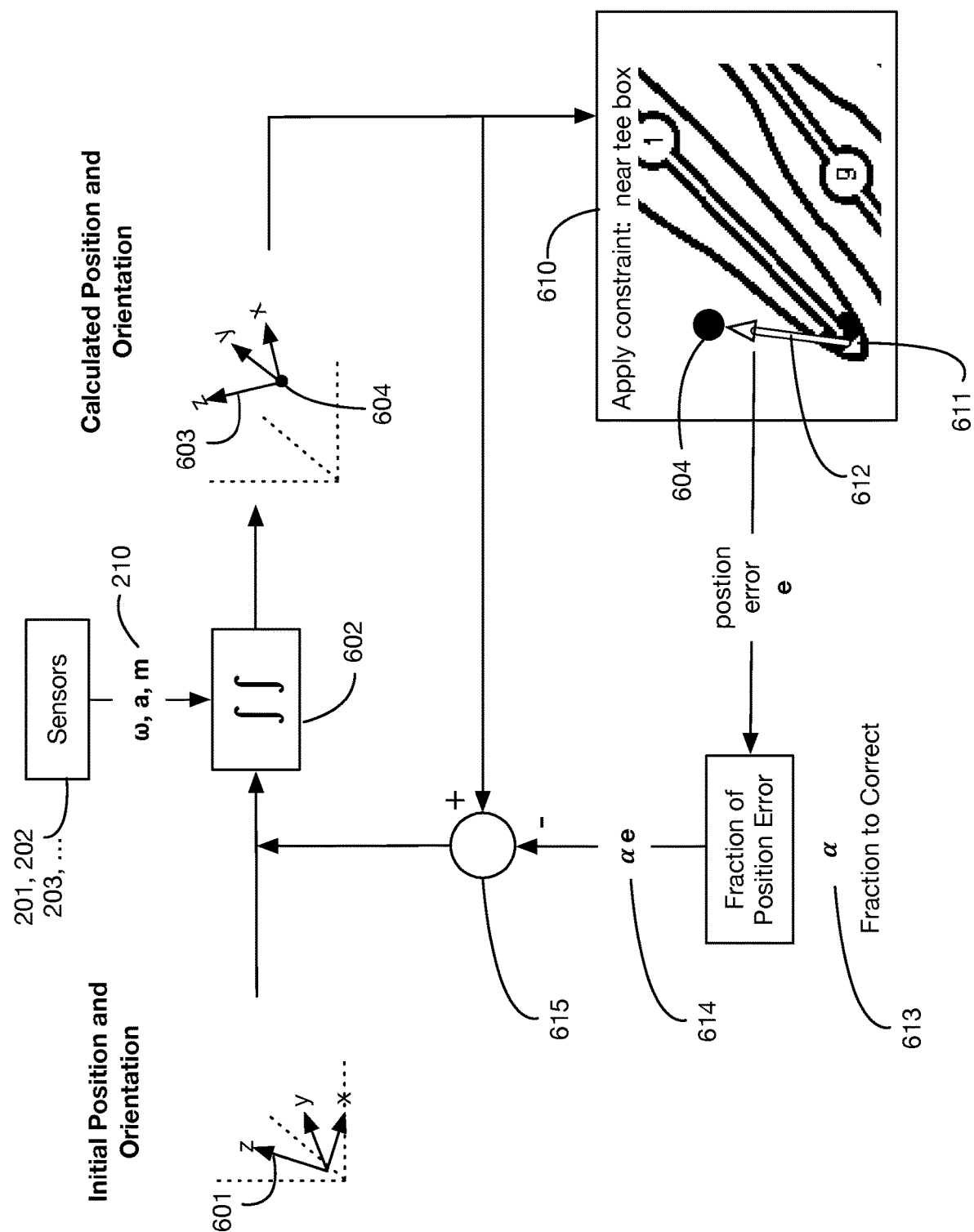
FIG. 6 illustrates an embodiment of the system that applies proportional error correction to position errors derived from position constraints in the virtual environment.

As discussed with respect to FIG. 3, step 304 may apply one or more constraints in the virtual environment to modify, transform, or correct the position or orientation of a virtual object in the virtual environment. In one or more embodiments these constraints may be applied for example to compensate for accumulating errors in position or orientation, due for example to drift in inertial navigation algorithms. These constraints may be applied instead of or in addition to the corrections using redundant sensor data as discussed for example with respect to FIG. 4. FIG. 6 illustrates an embodiment that measures the position and orientation of a real object using inertial sensors 201, 202, and 203. Sensor data 201 is integrated 602, starting from initial position and orientation 601, yielding updated position 604 and updated orientation 603. As is known in the art, integration of inertial sensor data over time can result in significant drift from the true position of the measured object. In one or more embodiments constraints in the virtual environment may be applied to compensate for this drift. In the example of FIG. 6, the desired position of the virtual object (in this case a virtual golf club) is in or near the tee box of a virtual hole. This constraint is applied in step 610 to calculate a position error 612 between the constrained position 611 (near the tee box) and the calculated position 604 after transformation to the virtual environment. In this illustrative example, a proportionality fraction 613 is applied to the position error 612, yielding a correction 614 that is added in step 615 to the calculated position 604. This continuous or periodic proportional error correction may compensate for the inertial drift and may prevent the virtual position of the virtual object from drifting away from the constrained region.

Figure 7:
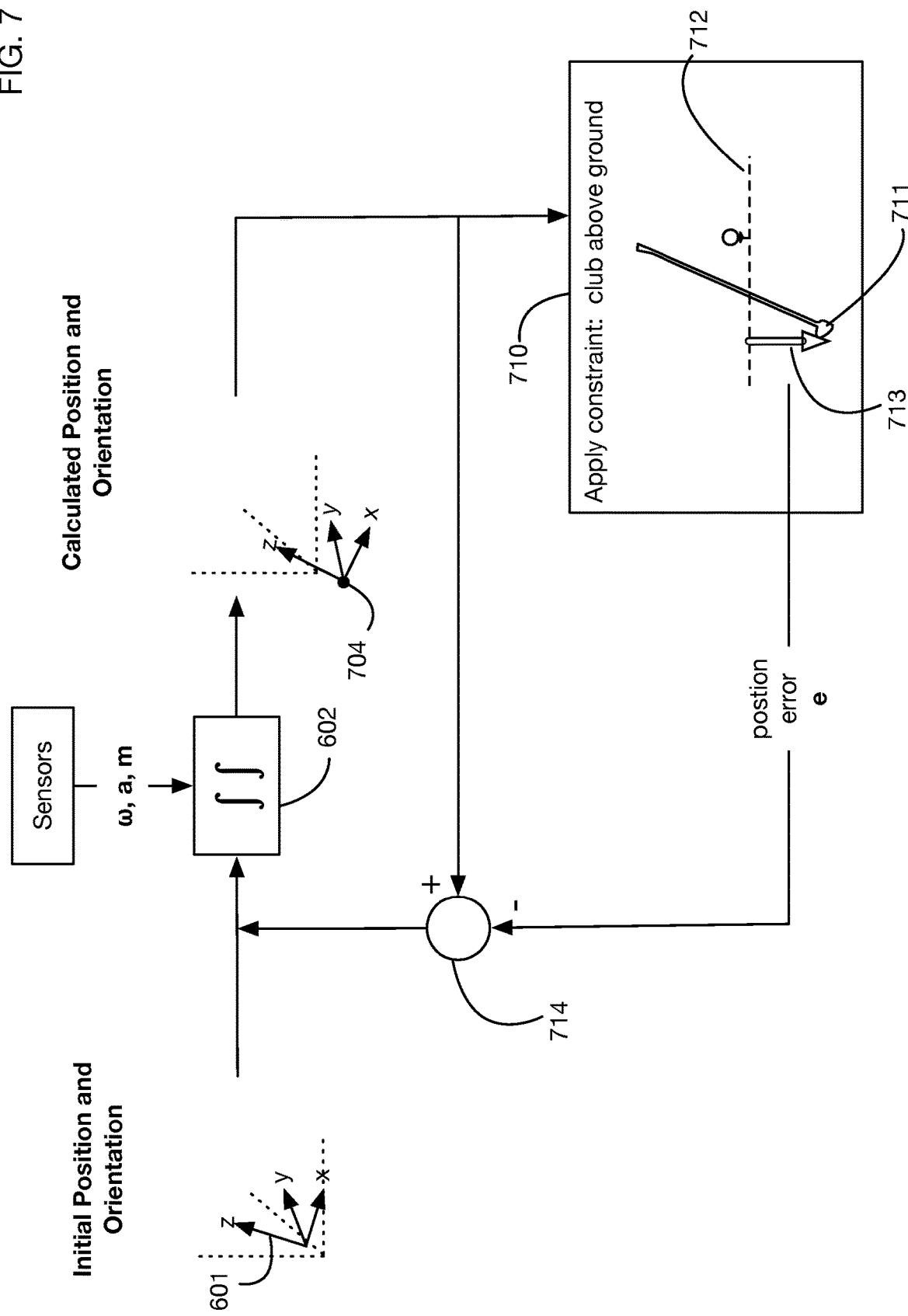
FIG. 7 illustrates an embodiment that applies a position constraint on a virtual object limiting it to a specific region of space, specifically to an above ground region.

Virtual environment constraints may also ensure that the position and orientation of a virtual object do not violate physical laws or the required configurations imposed by the virtual environment. FIG. 7 shows a variation of the example of FIG. 6, where the constraint applied in step 710 is that the virtual golf club must be entirely above the ground. This constraint expresses the physical law for the virtual environment that two solid objects cannot pass through one another. As described in FIG. 6, the calculated position 704 of the object may drift over time, including in this example drifting to place the golf club below ground. Constraint 710 is applied to calculate a position error 713 between the calculated vertical position of the golf clubhead 711 and the horizontal ground plane 712. In contrast to the example of FIG. 6, in this example the entire position error 713 is subtracted immediately from the calculated position 714, reflecting the absolute constraint 710. In this case a gradual move of the virtual golf club to place it above the ground may not be appropriate; instead the constraint is enforced immediately when the error is detected. One or more embodiments may use different approaches for different constraints: some constraints may be enforced rigidly and immediately, while others may for example result in gradual corrections over time using proportional error correction or similar approaches.

Figure 8:
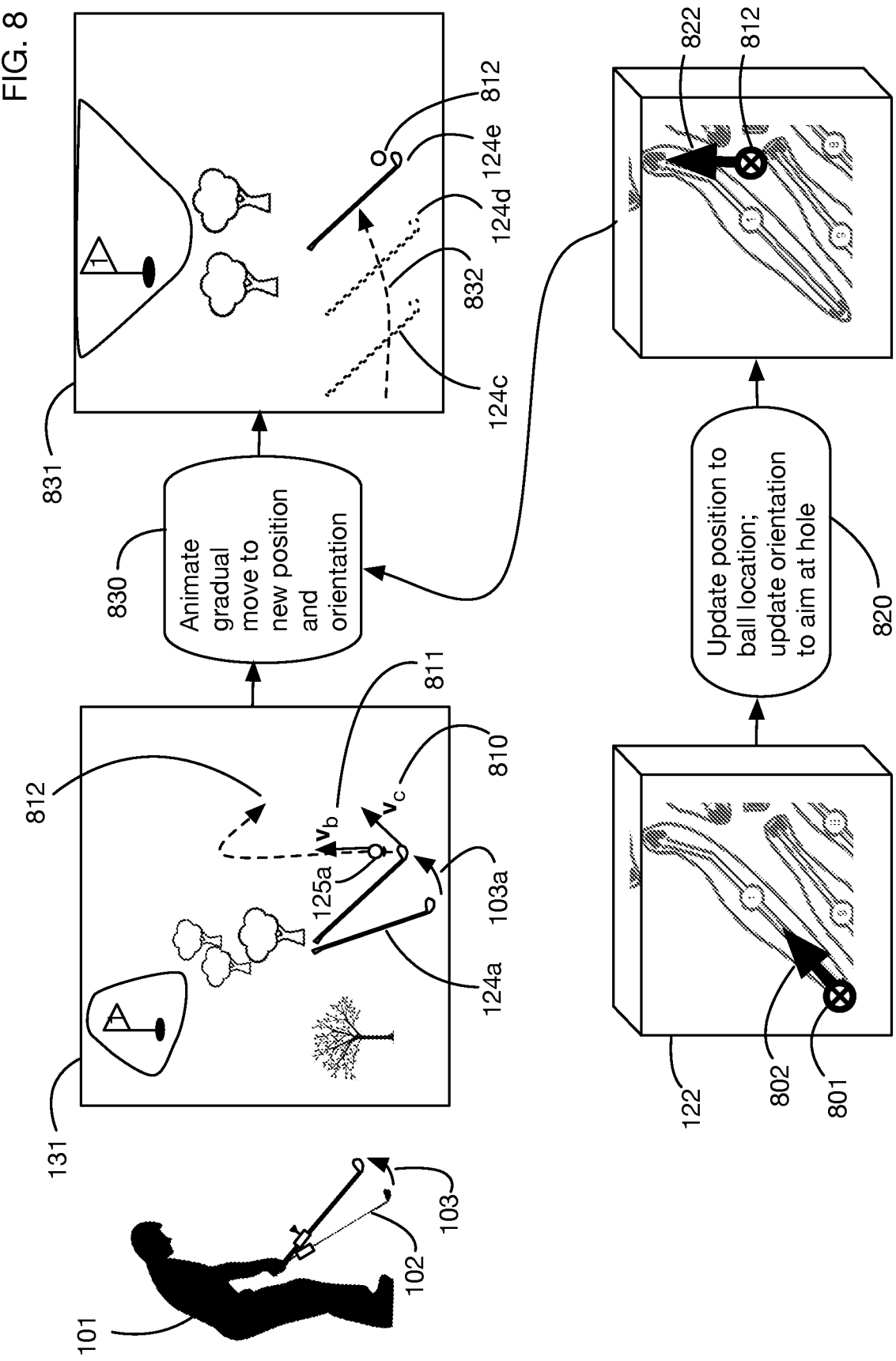
FIG. 8 shows an embodiment of a golf club mirroring system that calculates a ball trajectory from a virtual strike of a ball, and that then animates motion of a virtual golf club to the new position and orientation for a subsequent shot.

In one or more embodiments the position or orientation of a virtual object may be determined fully or partially by the state of the virtual environment at a point in time. For example, in embodiments that mirror motion to play a virtual game, the state of the game may affect the placement of the virtual object in the virtual environment. FIG. 8 illustrates an embodiment that mirrors motion of real golf club 102 to play a virtual round of golf in virtual environment 122. In this embodiment the position and orientation of the golf club change as the player advances through the course. For example, initially the virtual golf club is positioned at position 801 at the tee of the first hole, and is oriented in direction 802 facing down the first fairway. As the user executes motions such as motion 103 of the real club, virtual motions such as 103a are generated in the virtual environment. In this example, a virtual swing such as 103a is detected by the system and is interpreted as a strike of a virtual golf ball 125a. The system calculates the initial velocity 811 of the ball 125a based on the velocity 810 of the virtual club as it contacts the ball. This initial ball velocity 811 is then used to calculate the trajectory of the ball 125a, and to calculate the position 812 at which the ball lands after the shot. Techniques for predicting the trajectory of objects such as golf balls given initial conditions such as initial velocity (and potentially initial angular velocity or other characteristics as well) are known in the art.

After the virtual environment updates the position of the virtual ball 125a to its new position 812, the system may automatically update the position and orientation of the virtual golf club to reflect the new ball position. For example, the system executes update process 820 to move the virtual club position from 801 to 812, where the virtual ball landed after the shot. In addition, the system may automatically update the virtual club orientation to aim in the direction facing the hole from the new position, for example updating the aim vector of the club from 802 to 822. These updates to the position and orientation of the virtual club may occur automatically, even if the user 101 does not execute a specific motion of the real club 102 to make the changes. Subsequent motion of the club 102 may then be interpreted relative to the updated position 812 and updated orientation 822.

In one or more embodiments the system may perform a gradual, continuous update of the position and orientation of a virtual object, so that the viewer of the display does not observe a discontinuous jump. For example, in FIG. 8, the system executes animation process 830 to continuously shift the virtual club to the new position 812. In updated image 831 shown on the display, the virtual golf club moves continuously through trajectory 832, shifting gradually from position 124c to 124d and finally to position 124e adjacent to the updated ball position 812. Similarly, the orientation and aim direction of the club may be gradually and continuously modified to result in the new aim direction 822.

While the ideas herein disclosed has been described by means of specific embodiments and applications thereof, numerous modifications and variations could be made thereto by those skilled in the art without departing from the scope of the invention set forth in the claims.

What is claimed is:

1. A motion mirroring system that incorporates virtual environment constraints, comprising a motion capture element configured to couple with a moveable object located in a real environment, wherein said motion capture element comprises
  a sensor configured to capture one or more values associated with an orientation, position, velocity, acceleration, angular velocity, and angular acceleration of said motion capture element;
  a first communication interface; and,
  a microprocessor coupled with said sensor and said first communication interface, wherein said microprocessor is configured to
    collect data that comprises said one or more values from said sensor;
    transmit said data via said first communication interface;
a computer that comprises
  a display;
  a memory that contains
    a virtual environment state comprising a position and orientation of a virtual object in a virtual environment, wherein said virtual object represents said moveable object in said virtual environment, and wherein said virtual environment state mirrors motion of said moveable object in said real environment with motion of said virtual object in said virtual environment; and,
    one or more constraints on said position and orientation of said virtual object in said virtual environment;
  a second communication interface configured to communicate with said first communication interface to obtain said data;
  wherein said computer is configured to
    receive said data via said second communication interface;
    calculate a position and orientation of said moveable object in said real environment from said data;
    apply one or more corrections to said position and orientation of said moveable object in said real environment based on one or more redundancies in said data,
      wherein said sensor comprises a 3-axis accelerometer, a 3-axis rate gyroscope, and a 3-axis magnetometer, and
      wherein said one or more redundancies in said data is obtained from said 3-axis rate gyroscope combined with said 3-axis accelerometer and said a 3-axis magnetometer;
    transform said position and orientation of said moveable object in said real environment into said position and orientation of said virtual object in said virtual environment after said apply said one or more corrections;
    apply said one or more constraints in said virtual environment to compensate for accumulating errors in said position or orientation;
    determine whether said position and orientation of said virtual object in said virtual environment satisfies said one or more constraints;
    when said position and orientation of said virtual object in said virtual environment does not satisfy one or more of said one or more constraints, modify said position and orientation of said virtual object in said virtual environment to satisfy said one or more constraints to compensate for an error in said position and orientation not fully corrected by said one or more corrections as an error correction applied after said one or more constraints are applied in said virtual environment,
      wherein said error correction is in addition to said one or more corrections,
      wherein said error correction comprises continuous error correction or periodic proportional error correction, and
      wherein said continuous error correction or said periodic proportional error correction is based on a type of constraint of said one or more constraints, such that said type of constraint determines whether said continuous error correction is applied or whether said periodic proportional error correction is applied; and, display said virtual environment and said virtual object on said display.

2. The system of claim 1, wherein said moveable object is one or more of a piece of equipment, an article of clothing, or a body part of a person.

3. The system of claim 1, wherein said redundancies in said data comprise
  a calculation of said orientation of said moveable object in said real environment by integration of angular velocity data from said 3-axis rate gyroscope;
  a measurement of said orientation of said moveable object in said real environment relative to an Earth magnetic field from said 3-axis magnetometer; and,
  a measurement of said orientation of said moveable object in said real environment relative to an Earth gravitational field from said 3-axis accelerometer, when said data indicates that said moveable object is substantially stationary.

4. The system of claim 3, wherein
said calculate a position and orientation of said moveable object in said real environment from said data comprises said integration of angular velocity data from said 3-axis rate gyroscope; and,
said apply one or more corrections to said position and orientation of said moveable object in said real environment comprises one or more of
  calculate a first rotational error between
    a predicted magnetic field vector based on said integration of angular velocity data, and
    a measured magnetic field vector from said 3-axis magnetometer;
  apply a first fraction of said first rotational error to said orientation of said moveable object in said real environment;
  calculate a second rotational error between
    a predicted gravitational field vector based on said integration of angular velocity data, and
    a measured gravitational field vector from said 3-axis accelerometer;
  apply a second fraction of said second rotational error to said orientation of said moveable object in said real environment.

5. The system of claim 1, wherein
said virtual environment comprises a virtual camera that forms an image of said virtual environment;
said display said virtual environment and said virtual object on said display transmits said image of said virtual environment to said display; and,
a position and orientation of said virtual camera in said virtual environment is modifiable by a user.

6. The system of claim 1, wherein a change in said position and orientation of said moveable object in said real environment results in a corresponding change within a predefined time period of said position and orientation of said virtual object in said virtual environment shown on said display.

7. The system of claim 1, wherein said one or more constraints comprise a region in said virtual environment that said virtual object must be located within.

8. The system of claim 1, wherein said one or more constraints comprise a location in said virtual environment that said virtual object must be located near.

9. The system of claim 8, wherein said modify said position and orientation of said virtual object in said virtual environment to satisfy said one or more constraints comprises
calculate an error vector between said position of said virtual object in said virtual environment and said location; and,
add a fraction of said error vector to said position of said virtual object in said virtual environment.

10. The system of claim 1, wherein said one or more constraints comprise one or more of a maximum speed, a minimum speed, a maximum acceleration, a minimum acceleration, a maximum angular velocity, a minimum angular velocity, a maximum angular acceleration, and a minimum angular acceleration of said virtual object.

11. The system of claim 1, wherein said one or more constraints comprise one or more virtual barriers that said virtual object cannot pass through.

12. The system of claim 11, wherein said one or more virtual barriers comprise a ground surface.

13. The system of claim 1, wherein
said moveable object is a piece of sporting equipment used in a sports activity;
said virtual environment is a virtual game for said sports activity; and,
said virtual object in said virtual environment is a representation of said piece of sporting equipment.

14. The system of claim 13, wherein said sports activity is one or more of golf, tennis, badminton, racquetball, table tennis, squash, baseball, softball, cricket, hockey, field hockey, croquet, football, rugby, Australian rules football, soccer, volleyball, water polo, polo, basketball, lacrosse, billiards, horseshoes, shuffleboard, handball, bocce, bowling, dodgeball, kick ball, track and field events, curling, martial arts, boxing, archery, pistol shooting, rifle shooting, ice skating, gymnastics, surfing, skateboarding, snowboarding, skiing, windsurfing, roller blading, bicycling, and racing.

15. The system of claim 13, wherein
said virtual object is used to contact and launch a virtual game piece in said virtual game; and,
said computer calculates a launch velocity of said game piece based on a motion of said virtual object at a time of impact between said virtual object and said virtual game piece.

16. The system of claim 13, wherein said computer relocates said virtual object to a new position in said virtual environment in response to one or more events in said virtual game.

17. The system of claim 16, wherein said relocates said virtual object to a new position occurs gradually to prevent a user from observing a discontinuous change in position on said display.

18. The system of claim 16, wherein
said virtual game is a virtual golf game;
said virtual object is a virtual golf club; and,
said relocates said virtual object to a new position comprises moves said virtual golf club to a location of a virtual golf ball after a shot, or to a starting position for a new hole after completion of a previous hole.

19. The system of claim 18, wherein said moves said virtual golf club further comprises modifies an orientation of said virtual golf club to aim at a hole from said new position.

* * * * *